(12) United States Patent
Maltseff et al.

(10) Patent No.: US 7,920,512 B2
(45) Date of Patent: Apr. 5, 2011

(54) SYSTEMS, METHODS, AND DEVICES THAT DYNAMICALLY ESTABLISH A SENSOR NETWORK

(75) Inventors: Paul A. Maltseff, Edmonds, WA (US); Steven Winter, Stanwood, WA (US)

(73) Assignee: Intermec IP Corp., Everett, WA (US)

( * ) Notice: Subject to any disclaimer, the term of this patent is extended or adjusted under 35 U.S.C. 154(b) by 862 days.

(21) Appl. No.: 11/848,121

(22) Filed: Aug. 30, 2007

(65) Prior Publication Data

US 2009/0059842 A1 Mar. 5, 2009

(51) Int. Cl.
*H04Q 7/00* (2006.01)
*H04L 12/28* (2006.01)

(52) U.S. Cl. ........................................ 370/328; 370/401

(58) Field of Classification Search .................. 370/312, 370/328, 338, 401
See application file for complete search history.

(56) References Cited

U.S. PATENT DOCUMENTS

| | | | | |
|---|---|---|---|---|
| 6,418,526 | B1 * | 7/2002 | Denman et al. | 712/16 |
| 7,034,660 | B2 | 4/2006 | Watters et al. | 340/10.41 |
| 7,436,789 | B2 * | 10/2008 | Caliskan et al. | 370/310.1 |
| 7,483,403 | B2 * | 1/2009 | Herrmann et al. | 370/310 |
| 7,697,458 | B2 * | 4/2010 | Park et al. | 370/254 |
| 7,729,285 | B2 * | 6/2010 | Yoon | 370/254 |
| 2003/0152041 | A1 * | 8/2003 | Herrmann et al. | 370/310 |
| 2008/0068156 | A1 * | 3/2008 | Shimokawa et al. | 340/539.22 |
| 2008/0137624 | A1 * | 6/2008 | Silverstrim et al. | 370/338 |
| 2009/0019056 | A1 | 1/2009 | Othman et al. | |

OTHER PUBLICATIONS

Dressler, F., et al., "Self-Organization in Ad Hoc Networks: Overview and Classification," University of Erlangen, Dept. of Computer Science 7, Technical Report, Feb. 2006, pp. 1-12.
Dulman, S., et al., "Wave Leader Election Protocol for Wireless Sensor Networks," MMSA Workshop, Dec. 2002, 8 pages.
Gan, L., et al., "Agent-Based, Energy Efficient Routing in Sensor Networks," AAMAS, Jul. 19-23, 2004, 8 pages.
Heinzelman, W., et al., "Energy-Efficient Communication Protocol for Wireless Microsensor Networks," Proceedings of the 33rd Hawaii International Conference on System Sciences, 2000, pp. 1-10.
Maltseff, P., et al., "Systems, Methods and Devices for Collecting Data From Wireless Sensor Nodes," U.S. Appl. No. 11/848,033, filed Aug. 10, 2007.
Raghunathan, V., et al., "Energy-Aware Wireless Microsensor Networks," IEEE Signal Processing Magazine, Mar. 2002, pp. 40-50.
Maltseff et al., "Systems, Methods and Devices for Collecting Data From Wireless Sensor Nodes," Office Action mailed Sep. 1, 2010 for U.S. Appl. No. 11/848,033, 14 pages.

* cited by examiner

*Primary Examiner* — Hong Cho
(74) *Attorney, Agent, or Firm* — Seed IP Law Group PLLC

(57) ABSTRACT

A wireless sensor network includes a network sink node and a plurality of cluster nodes. The cluster nodes are configured to pass communications upstream and downstream. Each cluster node has a communication range, or coverage area. A cluster node is configured to communicate with sensor nodes within the coverage area of cluster node. The sensor nodes are configured to register with at least one cluster node. The cluster nodes are configured to register with the network sink. Identifiers for the sensor nodes may be dynamically generated. Identifiers for the cluster nodes may be dynamically generated.

23 Claims, 17 Drawing Sheets

130

| Cluster Capabilities Data Structure ||||| |
|---|---|---|---|---|
| SN Id | Power Source | Sensor | Transmission Power Level Settings | |
| 1 | passive inductive | EM | 0.8 | ... |
| 2 | piezoelectric | acoustic | 1.2 | |
| 3 | battery | chemical | 0.5 | |
| ⋮ | ⋮ | ⋮ | ⋮ | |

| Sensor Network Capabilities Data Structure ||||||
| Cluster || Cluster Capabilities ||| |
| NN Id | SN Id | Power Source | Sensor | Power Level | ... |
| 0 | 0 | battery | ———— | 0.9 | . |
|   | 1 | passive inductance | E-M | 0.8 | . |
|   | 2 | piezoelectric | acoustic | 1.2 | . |
|   | 3 | battery | chemical | 0.5 | . |
|   | . | . | . | . |   |
| 1 | 0 | solar | ———— | 1.2 | . |
|   | 1 | battery | biological | 1.1 | . |
|   | 2 | capacitive | thermal | 0.7 | . |
|   | 3 | piezoelectric | E-M | 0.4 | . |
|   | . | . | . | . |   |

*Fig. 11*

SYSTEMS, METHODS, AND DEVICES THAT DYNAMICALLY ESTABLISH A SENSOR NETWORK

BACKGROUND

1. Technical Field

This disclosure generally relates to wireless sensor networks, and more particularly to establishing a communications in a wireless sensor network.

2. Description of the Related Art

Networks built from small nodes with sensing and wireless communications capabilities may be used to collect data in a variety of environments. Each wireless sensor node is typically an autonomous device that detects or monitors environmental characteristics of its surrounding environment. These wireless sensor nodes may then organize themselves flexibly and autonomously (i.e., without direct central control) into a network for data collection and delivery.

Such networks may be used in the performance of a number of tasks, including monitoring manufacturing facilities, infrastructure or construction sites, tracking documents, detecting changing weather conditions or early warning signs for natural disasters, etc. The wireless sensor nodes may be positioned at precise locations or scattered randomly throughout the monitored environments to detect characteristics including: temperature, density, strain, deformation, acceleration, pressure, opacity, concentration, chemical state, resistance, phase changes, humidity, etc. The wireless sensor nodes may be periodically or continuously queried to obtain information regarding past or current environmental characteristics.

The above-described networks typically do not rely on every wireless sensor node functioning perfectly. Indeed, even persistent communication between particular wireless sensor nodes within the network is not assumed. Each individual wireless sensor node may be relatively low-powered and may have relatively limited functionality and intelligence.

The individual wireless sensor nodes may range from "macro-sized" wireless sensor nodes, from the size of backpacks to roughly the size of a coin, to "micro-sized" sensor nodes, that can be the size of dust particles. These wireless sensor nodes may communicate wirelessly in a number of ways, but most commonly communicate via electromagnetic radiation (e.g., radio or microwave wavelengths).

In one implementation, each wireless sensor node may include a radio frequency identification ("RFID") transponder commonly referred to as an RFID tag. Such RFID tags typically employ an antenna coupled to a wireless transponder circuit to transmit and/or receive data via electromagnetic signals in some frequency range.

The wireless transponder circuit found in many RFID tags typically includes a memory portion and a logic portion. The memory portion stores data, while the logic portion controls the reading, writing, and manipulating of data in the memory portion. The logic portion may further couple between the memory portion and the antenna to act as a transmitter, receiver, or transceiver for reading and/or writing data to and/or from the RFID tags.

Active wireless sensor nodes may include a discrete consumable power source, such as a battery, to provide power to the wireless transponder circuit and the sensor. In contrast, passive wireless sensor nodes may derive power from a wireless interrogation signal, for example, by backscattering the signal as a response signal encoded with information from the wireless sensor node.

Wireless sensor networks, especially microsensor networks (i.e., networks having "micro-sized" sensor nodes), are frequently amorphous networks in which sensor nodes may be randomly distributed. Also, microsensor networks may contain hundreds or thousands of sensor nodes, which are generally made as cheap and energy-efficient as possible. As the number of sensors in a sensor network increases so does the amount of data collected by the sensors. The amount of data that may be collected from a sensor network may be limited by the bandwidth of the sensor network. There is a need for systems, methods, and devices that facilitate establishment of an amorphous network and/or randomly distributed sensor nodes. There is also a need for systems, methods, and devices that conserve network bandwidth. There is also a need for systems, methods, and devices that conserve energy in wireless sensor networks.

BRIEF SUMMARY

In one aspect, a micro-structure sensor network includes a network sink node, a plurality of cluster nodes, and a plurality of micro-structure sensor nodes. The network sink node includes a memory that stores a network sensor capabilities data structure, and the network sink node is configured to communicate wirelessly with the plurality of cluster nodes. Each cluster node is configured to wirelessly communicate with the network sink node and with other cluster nodes. Each cluster node has a respective network node identifier associated with the respective cluster node. Each sensor node is in direct wireless communication with a number of cluster nodes and has a memory with the same number of network node identifiers and the same number of dynamically generated cluster-unique sensor node identifiers stored therein. Each sensor node has at least one characteristic, and the network sensor capabilities data structure carries information for each sensor node that is indicative of the respective at least one characteristic of the respective sensor node and associates the respective at least one characteristic with at least one respective cluster-unique sensor node identifier.

In another aspect, a method of establishing a low-power sensor network includes: wirelessly registering at each cluster node of a plurality of cluster nodes a number of sensor nodes physically located within a respective coverage region of the respective cluster node, wherein the number of sensor nodes physically located within the respective coverage region of the respective cluster node and the respective cluster node make up a respective cluster; associating at each cluster node at least one characteristic of a respective sensor node in the respective cluster with a respective cluster-unique sensor node identifier; and wirelessly registering at a network sink node each cluster node of the plurality of cluster nodes with the network sink node.

In another aspect, a method of establishing a low-power cluster of wireless sensor nodes includes: wirelessly broadcasting a first registration message from a cluster node to a plurality of unregistered sensor nodes that are in direct communication range with the cluster node; initiating a current registration interval of time in response to broadcasting the registration message; receiving at the cluster node a number of registration requests prior to an end of the current registration interval; and determining at the cluster node after the end of the current registration interval whether to wirelessly broadcast a second registration message from the cluster node or whether to register one of the unregistered sensor nodes based at least partially upon the number of received registration requests. In response to determining to broadcast the second registration message the method further includes:

broadcasting the second registration message from the cluster node to the plurality of unregistered sensor nodes that are in direct communication range with the cluster node; and initiating a subsequent registration interval of time in response to broadcasting the registration message. In addition, in response to determining to register one of the unregistered sensor nodes the method further includes: associating at the cluster node a respective unregistered sensor node with a dynamically generated cluster unique sensor node identifier in response to the cluster node receiving from the respective sensor node a respective registration request; and registering at the cluster node the previously unregistered respective sensor node having the dynamically generated cluster unique sensor node identifier associated therewith.

In yet another aspect, a cluster node includes a microstructure housing that carries a wireless communication device, a processor, and a memory. The processor is in communication with the wireless communication device and the memory that executes instructions. The memory includes instructions that cause the processor to: broadcast a first registration message to a plurality of unregistered sensor nodes that are in direct communication range with the cluster node; initiate a current registration interval of time in response to broadcasting the registration message; and determine after an end of the current registration interval whether to wirelessly broadcast a second registration message from the cluster node or whether to register one of the unregistered sensor nodes based at least partially upon a number of received registration requests. In response to determining to broadcast the second registration message, the processor executes further instructions that cause the processor to: broadcast the second registration message to the plurality of unregistered sensor nodes that are in direct communication range with the cluster node; and initiate a subsequent registration interval of time in response to broadcasting the registration message. In response to determining to register one of the unregistered sensor nodes, the processor executes further instructions that cause the processor to: associate at the cluster node a respective unregistered sensor node with a dynamically generated cluster unique sensor node identifier in response to the cluster node receiving from the respective sensor node a respective registration request; and register the previously unregistered respective sensor node having the dynamically generated cluster unique sensor node identifier associated therewith.

BRIEF DESCRIPTION OF THE SEVERAL VIEWS OF THE DRAWINGS

FIG. 8 is a diagram of an exemplary cluster capabilities data structure according to one non-limiting illustrated embodiment.

FIG. 11 is a diagram of sensor network capabilities data structure according to one non-limiting illustrated embodiment.

Figure 1:
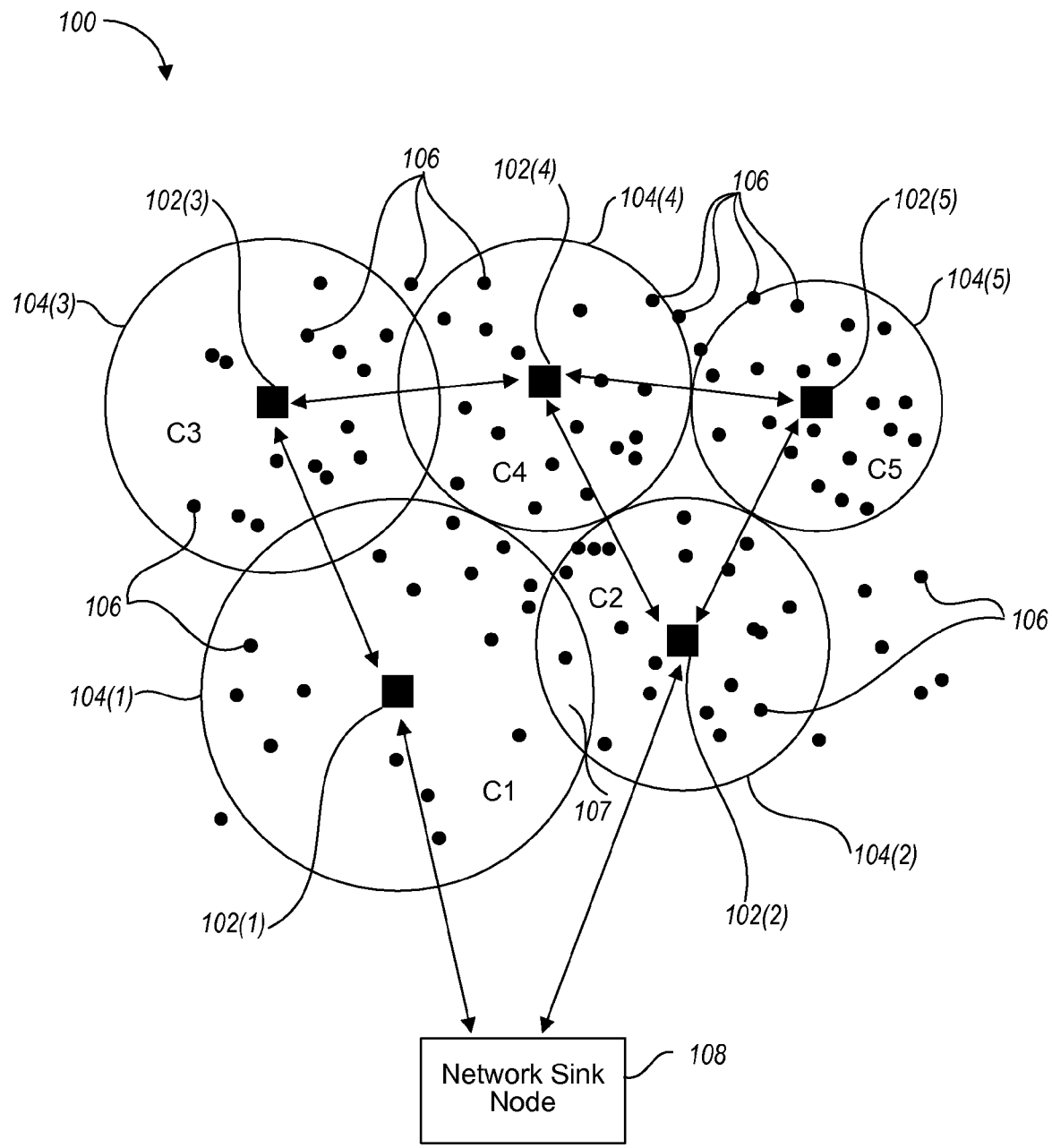
FIG. 1 is a block diagram of a sensor network according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sensor networks and/or with micro-sensor networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions, steps, or acts in establishing a sensor network and/or in controlling transmission power levels in a sensor network. In alternative embodiments, which are within the scope sensor network communication protocol, various logical functions, steps, or acts may be executed out of order from that shown or discussed, including substantially concurrently or in reverse order, and/or manually, depending on the functionality involved, as would be understood by those reasonably skilled in the art.

FIG. 1 shows a sensor network 100 according to one non-limiting illustrated embodiment. The sensor network 100 has cluster nodes, individually referenced as 102(1) through 102(5) and collectively referenced as 102. Each one of the cluster nodes 102 is located within a coverage region, individually referenced as 104(1) through 104(5) and collectively referenced as 104.

The sensor network 100 also includes a plurality of sensor nodes 106. Each one of the sensor nodes 106 is configured for wireless communications, and each one of the sensor nodes 106 is configured to sense/detect various environmental characteristics that may be in proximity to the respective sensor node 106. For example, some of the sensor nodes 106 may detect electromagnetic energy. In the present description, electromagnetic energy is used in a broad sense to include any or all of the conventional electromagnetic spectrum, e.g., from extremely low frequency (ELF) of approximately 30 Hz to gamma rays of approximately 300 ExaHz, inclusive. Similarly, some of the sensor nodes 106 may detect/sense acoustic energy, which may be above or below or in the hearing range of the average human. In addition, some sensor nodes 106 may detect chemical agents and/or biological agents, or temperature, humidity, pressure, pH, acceleration, strain, etc.

The sensor nodes 106 within one of the coverage regions 104 are able to wirelessly communicate with the respective cluster node 102. One of the cluster nodes 102 and the sensor nodes 106 within the respective coverage region 104 make up a cluster, which are referred to as C1-C5, respectively.

As can be seen in FIG. 1, sometimes coverage regions 104 may overlap. Sensor nodes 106 that are within the intersection of two or more coverage regions 104 may communicate with each of the respective cluster nodes 102, and such sensors belong to multiple clusters. For example, the sensor nodes 106 within the intersection 107 of coverage regions 104(1) and 104(2) may communicate with cluster nodes 102(1) and 102(2), and those sensor nodes are part of clusters C1 and C2.

Also as can be seen in FIG. 1, the coverage regions 104 may be of different size and may be of different shape. The size and shape of individual coverage regions 104 will depend in part upon the respective cluster node 102 and other factors such as, but not limited to, topography, sources of electrical interference, etc. Some cluster nodes 102 might have more power for transmitting/broadcasting than other cluster nodes 102, and consequently, such cluster nodes 102 may have larger coverage regions 104.

The sensor nodes 106 within a coverage region 104 wirelessly communicate data to the respective cluster node 102. To facilitate communication between the sensor nodes 106 and the respective cluster node 102, each sensor node 106 may be associated with a cluster-unique sensor identifier. In one embodiment, the cluster-unique sensor identifier may comprise a numerical identifier that is dynamically generated after the sensor nodes have been deployed.

A cluster node 102 may gather data from one or all of the sensor nodes 106 within the coverage region 104 of the respective cluster node 102 and may aggregate the data and/or may process the data. The cluster node 102 may send the raw data and/or aggregated data and/or processed data upstream to either another cluster node 102 or a network sink node 108.

To facilitate communication between the cluster nodes 102 and the network sink node 108 and cluster nodes 102, each cluster node 102 may be associated with a unique network identifier. In one embodiment, the identifier may comprise a numerical identifier stored on the cluster node 102 during manufacturing. For example, a numerical identifier may be stored on read-only memory within the cluster node 102. In another embodiment, the identifier for each wireless sensor node 102 may be variable and may be dynamically generated during a network association process.

The network sink node 108 interfaces with cluster nodes 102 and with back end equipment/systems (not shown) such as other networks, computer systems, databases, etc. Together the network sink node 108 and the cluster nodes 102 make network nodes of the sensor network 100. The network sink node may be associated with a unique network identifier. In one embodiment, the identifier may comprise a numerical identifier stored on the cluster node 102 during manufacturing.

The cluster nodes 102 may be configured to relay communications. For example, the cluster nodes 102(1) and cluster nodes 102(2) are in direct communication with the network sink node 108. Thus, the network sink node 108 may communicate with cluster nodes 102(3) through 102(5) by sending a downstream communication to either cluster node 102(1) and/or 102(2). The communication may be passed downstream between as many cluster nodes 102 as needed to reach the desired cluster node 102. In some embodiments, the cluster nodes 102 may be configured to selectively communicate with other cluster nodes 102. The selectivity may be based upon, among other things, the nature of the communication. For example, cluster nodes 102(1) and 102(2), which are in direct communication with the network sink node 108, might communicate network related information between each other, and yet, not communicate information related to data gathered by the sensor nodes 106.

Figure 2:
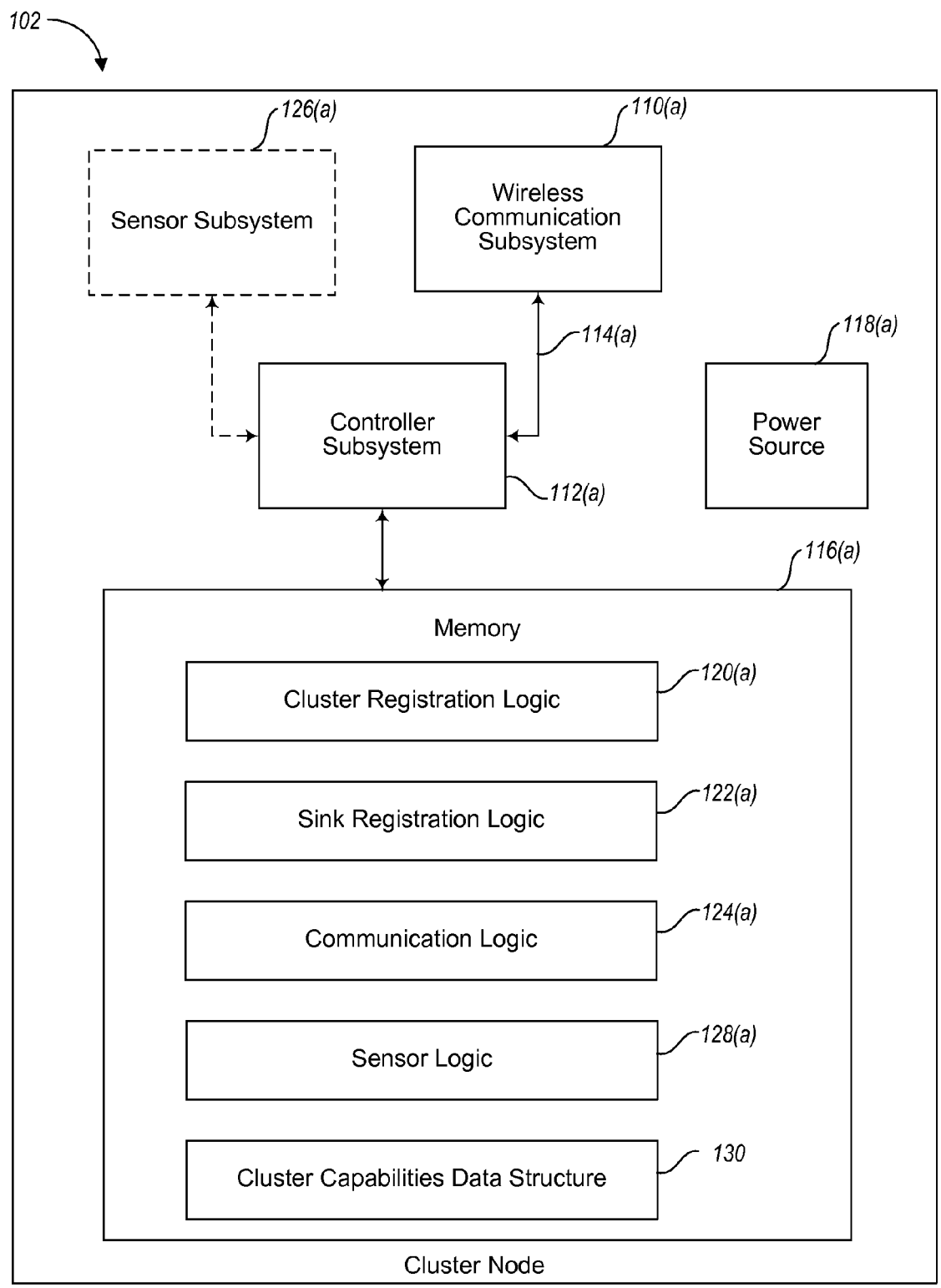
FIG. 2 is a block diagram of a sensor node of FIG. 1 according to one non-limiting illustrated embodiment.

FIG. 2 shows a block diagram of a cluster node 102 according to one non-limiting illustrated embodiment. The cluster node 102 may be any suitable device for forwarding messages upstream and downstream and for gathering data from sensor node 106. In one embodiment, the cluster node 102 may be chosen to operate on very little power, and in severe environmental conditions. For example, a silicon-based micro-electromechanical system (MEMS) may be employed. MEMS may serve as pressure sensors, accelerometers, strain gauges, temperature sensors, etc. By using a MEMS device, the cluster node 102 may achieve robust networking using very little power.

The cluster node 102 may include a wireless communication subsystem 110(a), a controller subsystem 112(a) and at least one bus 114(a) that communicatively couples the wireless communication subsystem 110(a) and the controller subsystem 112(a). The wireless communication subsystem 110(a) may provide two-way wireless communication with sensor nodes 106 and/or with other cluster nodes 102 and/or with the network sink node 108. In some embodiments, the wireless communication subsystem 110(a) may include a sensor node communication subsystem, which may provide two-way communication between the cluster node 102 and sensor nodes 106, and a network node communication subsystem, which may provide two-way communications with other network nodes such as other cluster nodes 102 and on the network sink node 108.

The cluster node 102 may also include a power source 118(a) that provides the various components of the cluster node 102 with electrical power at appropriate voltages and currents. The power source 118(a) may be a consumable internal power storage device (e.g., battery). Alternatively, the power source 118(a) may be a transducer-type power source such as, but not limited to, a piezoelectric transducer that converts vibrational energy into electrical energy, a capacitive or inductive transducer that converts received electromagnetic energy into electrical energy, photo voltaic, etc.

Controller subsystem 112(a) may be a hardware device for executing software, particularly that stored in a memory 116(a). Controller subsystem 112(a) can be a custom made or commercially available processor, a central processing unit (CPU), a semiconductor based microprocessor (in the form of a microchip or chip set), or generally any device for executing software instructions.

The memory 116(a) is communicatively coupled to the controller subsystem 112(a). The memory 116(a) may include any one or combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

The memory 116(a) may store one or more logic modules or logic routines, each of which may comprise an ordered listing of executable instructions for implementing logical functions. In particular, the memory 116(a) includes an operating system (not shown), cluster registration logic 120(a), sink registration logic 122(a), and communication logic 124(a). In addition, the memory 116(a) may store a cluster capabilities data structure 130, e.g., a table or set of records, and sensor logic 128(a). The execution of the operating system by the controller subsystem 112(a) essentially controls the execution of other logic, such as cluster registration logic 120(a), sink registration logic 122(a), communication logic 124(a), and sensor logic 128(a) and provides scheduling, input-output control, file and data management, memory management, and communication control and related services.

Among other things, the controller subsystem 112(a) may implement the cluster registration logic 120(a) to register sensor nodes 106 with which the cluster node 102 may establish communications, i.e., sensor nodes 106 within the coverage area 104 of the cluster node 102. During the registration of one of the sensor nodes 106 within the coverage area 104 of the cluster node 102, the cluster node 102 may receive sensor capabilities information from the respective sensor node 106. The controller subsystem 112(a) may use the received sensor capabilities information to dynamically create the cluster capabilities data structure 130. In some embodiments, sensor capabilities information from each of the registered sensor nodes may be received by the cluster node 102 after the sensor nodes 106 within the coverage area 104 of the cluster node 102 have been registered with the cluster node 102.

The controller subsystem 112(a) may implement the network sink registration logic 122(a) to register the cluster node 102 with the network sink node 108. The controller subsystem 112(a) may also implement the network sink registration logic 122(a) to register other cluster nodes 102 with the network sink node 108.

In some embodiments, the network sink registration logic 122(a) may include logic by which the cluster node 102 may generate a pseudo random number. In other embodiments, the controller subsystem 112(a) may include logic that generates a pseudo random number. In other embodiments, the network sink registration logic 122(a) may include a network node identifier, which may be unique to the respective cluster node 102. The network node identifier may be provided to the cluster node 102 after manufacture of the cluster node 102 and prior to deployment of the cluster node 102. Alternatively, the network node identifier may be provided to the cluster node 102 during manufacture of the cluster node 102.

During or after registration with the network sink node 108, the cluster node 102 may provide the network sink node 108 with network information with which the network sink node 108 may create a network map of the sensor network 100. For example, a given cluster node 102 may provide the network sink node 108 with a list of all network devices, such as the network sink 108 and other cluster nodes 102, with which the given cluster node 102 is in direct communication. Similarly, during or after registration with the network sink node 108, the cluster node 102 may provide the network sink node 108 with the cluster capabilities data structure 130 or related or similar information from which the network sink node 108 may create a sensor network capabilities data structure.

The controller subsystem 112(a) may implement the communication logic 124(a) to manage the wireless communication subsystem 110(a). The communication logic 124(a) may include a network map, e.g., a map that includes network node identifiers of all of the cluster nodes 102 and the network sink node 108 and direct communication links therebetween. A network map may include information such as the minimum number of hops from a respective one of the cluster nodes 102 to the network sink node 108. A network map may also include information related to transmission power levels for communications between pairs of cluster nodes 102 and/or communications between the network sink node 108 and some of the cluster nodes.

The controller subsystem 112(a) may send the wireless communication subsystem 110(a) various control signals. For example, the control signals may instruct the wireless communication subsystem 110(a) to forward a message received by the cluster node 102. The controller subsystem 112(a) may also send the wireless communication subsystem 110(a) messages for transmission therefrom and may also send a transmission power level setting. The controller subsystem 112(a) may monitor transmission power levels of the wireless communication subsystem 110(a) and provide control signals that may instruct the wireless communication subsystem 110(a) to change the power level at which the wireless communication subsystem 110(a) transmits.

In the embodiment illustrated in FIG. 2, the cluster node 102 includes an optional sensor subsystem 126(a) and sensor logic 128(a). The sensor subsystem 126(a) may be configured to detect among other things, electromagnetic energy, acoustical energy, vibrational energy, chemical agents, and biological agents, pH, temperature, strain, etc. The controller subsystem 112(a) may implement the sensor logic 128(a) to control the sensor subsystem 126(a).

The cluster node 102 may send raw data to the network sink node 108. The raw data may be collected by the sensor subsystem 126(a) and/or raw data may be collected by sensor nodes 106.

In some embodiments, the cluster node 102 receives data from sensor nodes 106 that are registered with the cluster node 102. The cluster node 102 may process the data and provide the network sink node 108 with processed data. For example, the cluster node 102 may aggregate data from multiple sensor nodes 106 or may aggregate data from one or more sensor nodes 106 over time and provide the network sink node 108 with the aggregated data.

In some embodiments, the cluster node 102 may receive data, which is destined to the network sink node 108, from other cluster nodes 102. The cluster node 102 may process the data from other cluster nodes 102 and forward the processed data upstream toward the network sink node 108. For example, a cluster node 102 may aggregate data received from one or more other cluster nodes with data collected by the cluster node 102 and/or data collected by the sensor nodes 106 that are registered with the cluster 102.

Generally, the size of raw data, e.g., the number of bits for storing or transmitting, is greater than the size of processed data. The amount of available bandwidth of the sensor network 100 may be increased by sending processed data from the cluster nodes 102 to the network sink node 108.

In addition, processing raw data and sending processed data may require less energy consumption at the cluster node 102 than sending raw data. Thus, the energy consumption of the sensor network 100 may be decreased by sending processed data.

Figure 3:
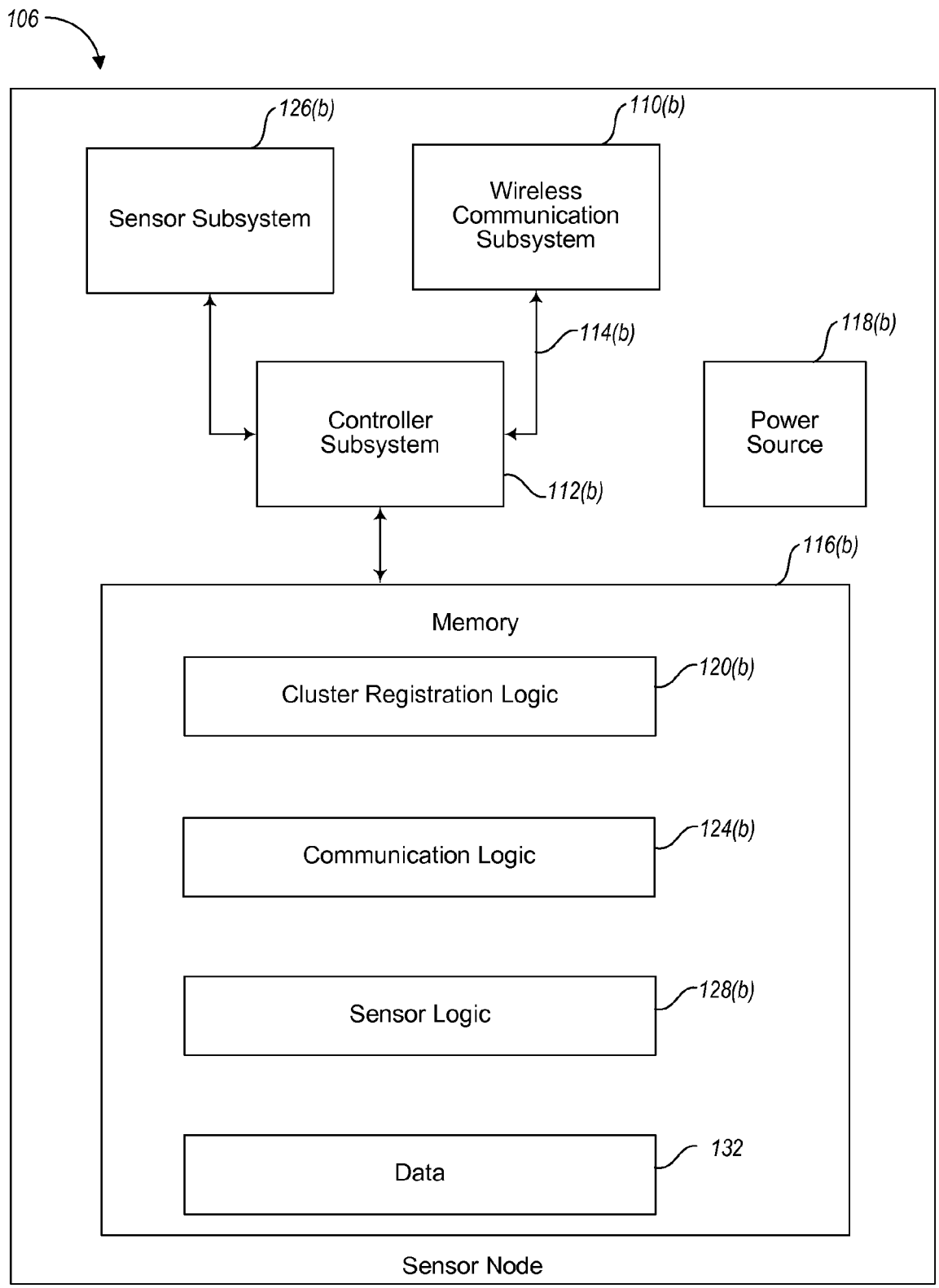
FIG. 3 is a block diagram of a cluster node of FIG. 1 according to one non-limiting illustrated embodiment.

FIG. 3 is a block diagram of a sensor node 106 according to one non-limiting illustrated embodiment. In FIG. 3, the various labels having both a reference numeral and a letter "b" identify components and/or features that are similar in at least some respects as those shown in FIG. 2 that are labeled with the same reference numeral and the letter "a." The detailed description of such components are initially provided with respect to the embodiment of FIG. 2 and, for the sake of brevity, the description of such components in the context of their subsequent "b" labeled counterparts in FIG. 3 are abbreviated or omitted.

The sensor node 106 may be any suitable device for sensing device for detecting and/or monitoring environmental characteristics and providing data related to the detected/monitored environmental characteristics to the cluster node 102. In one embodiment, the sensor node 102 may be chosen to operate on very little power, and in severe environmental conditions. For example, a silicon-based micro-electromechanical system (MEMS) may be employed. MEMS may serve as pressure sensors, temperature sensors, pH sensors, accelerometers, strain gauges, etc. By using a MEMS device, the sensor node 106 may achieve robust environmental sensing using very little power.

Cluster registration logic 120(b) is stored in the memory 116(b). The cluster registration logic 120(b) is complementary to the cluster registration logic 120(a) at the cluster node 102. In some embodiments, cluster registration logic 120(b) may include logic for a pseudo random number generator. In some embodiments, the controller subsystem 112(b) may include logic for a pseudo random number generator.

The controller subsystem 112(b) may implement the cluster registration logic 120(b) to register the sensor node 106 with one or more cluster node 102 with which the sensor node 106 may establish communications. In other words, when the sensor node 106 is within a respective coverage region 106 of one or more cluster nodes 102, the sensor node 106 may register with each of the one or more cluster nodes 102. During the registration with each of the one or more cluster nodes 102, the sensor node 106 may provide each of the one or more cluster nodes 102 with sensor capabilities information. In addition, the sensor node 106 may be dynamically assigned a sensor node identifier from each of the one or more cluster nodes 102 during the registration with each of the one or more cluster nodes 102. Similarly, the sensor node 106 may dynamically generate a number of sensor node identifiers during the registration with each of the one or more cluster nodes 102. Generally, the number of sensor node identifiers may be equal to the number of the one or more cluster nodes 102 with which the sensor node 106 registers.

The controller subsystem 112(b) may implement the cluster registration logic 120(b) to provide sensor node characteristics to cluster nodes 102 with which the sensor node 106 is registering. Sensor node characteristics may include, among other things, information related to internal structure of a sensor node 106, type of sensor, available memory, communication capabilities (MIMO), orthogonal codes, space block time code, CDMA, etc. and/or power source.

The controller subsystem 112(b) may implement the sensor logic 128(b) to control the sensor subsystem 126(b) and to store data 132 in the memory 116(b). In addition, the sensor logic 128(b) may be used to process raw data prior to sending the data upstream and/or prior to storing the data 132.

Figure 4:
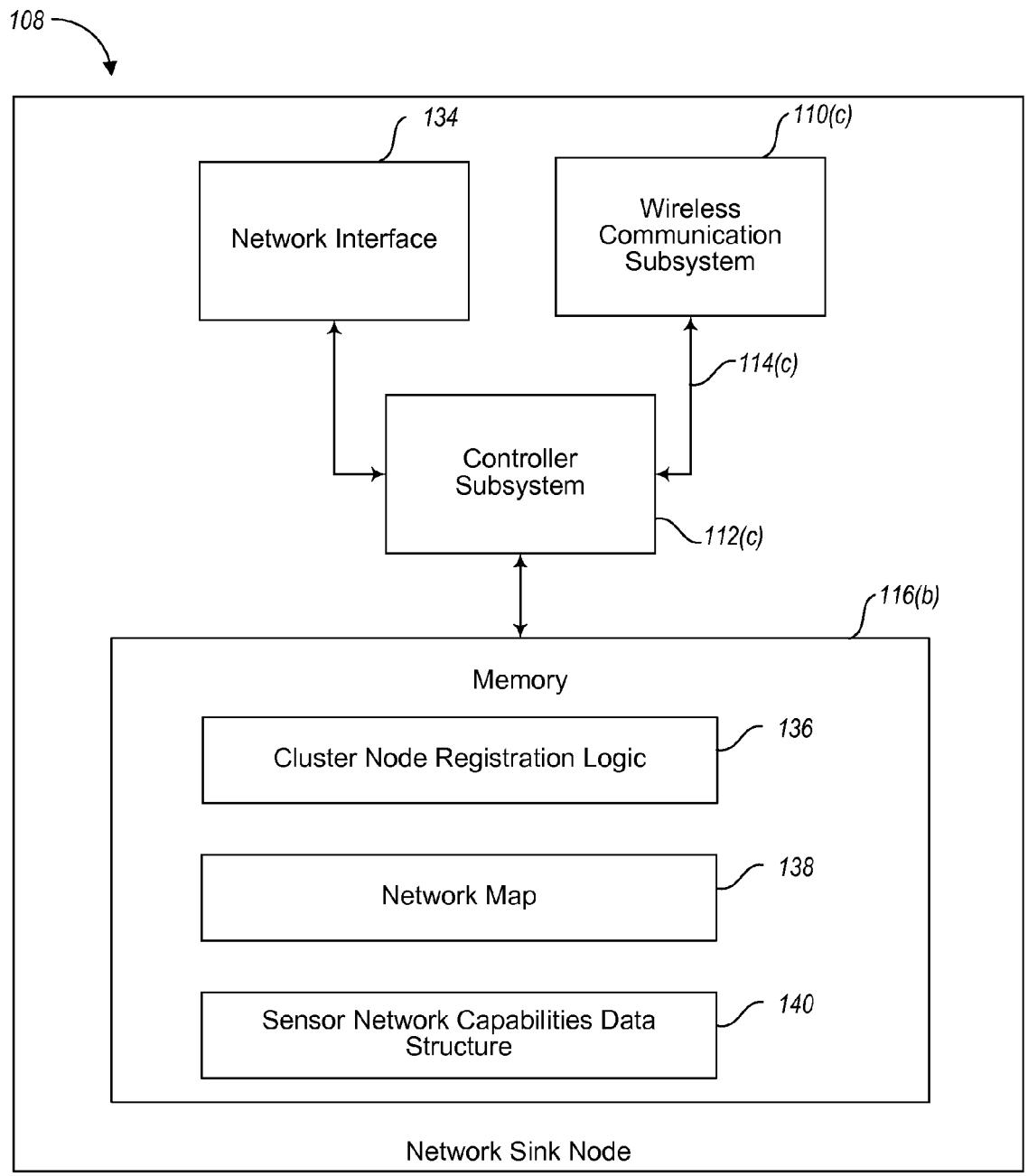
FIG. 4 is a block diagram of a network sink node of FIG. 1 according to one non-limiting illustrated embodiment.

FIG. 4 is a block diagram of a network sink node 108 according to one non-limiting illustrated embodiment. In FIG. 4, the various labels having both a reference numeral and a letter "c" identify components and/or features that are similar in at least some respects as those shown in FIG. 2 that are labeled with the same reference numeral and the letter "a." The detailed description of such components are initially provided with respect to the embodiment of FIG. 2 and, for the sake of brevity, the description of such components in the context of their subsequent "c" labeled counterparts in FIG. 4 are abbreviated or omitted.

Cluster node registration logic 136 is stored in the memory 116(c). The cluster node registration logic 136 is complementary to the cluster registration logic 120(a) at the cluster node 102. In some embodiments, cluster node registration logic 136 may include logic for a pseudo random number generator. In some embodiments, the controller subsystem 112(c) may include logic for a pseudo random number generator. The cluster node registration logic 136 may include a network node identifier for the network sink node 108 and/or logic that generates a network node identifier.

The controller subsystem 112(c) may implement the cluster node registration logic 136 to register the cluster nodes 102. During the registration of the cluster nodes 102, the network sink node 108 may receive from each of the cluster nodes 102 cluster capabilities information and/or table. In addition, the network sink node 108 may dynamically assign a network node identifier to each of the cluster nodes 102.

The controller subsystem 112(c) may implement the cluster registration logic 136 to dynamically generate and update a network map 138. The network map 138 may show, among other things, direct communication links between pairs of network nodes. The controller subsystem 112(c) may provide the network map 138 and/or portions of the network map 138 to the cluster nodes 102.

The controller subsystem 112(c) may implement the cluster registration logic 136 to dynamically generate and update a sensor network capabilities data structure 140, e.g., a table or set of records. The sensor network capabilities data structure 140 may show, among other things, capabilities of each cluster and/or capabilities of each sensor node 106 within a cluster. The sensor network capabilities data structure 140 may be a compilation of cluster capabilities data structures 130.

In one embodiment, the sensor nodes 106 may transmit communications at variable power levels. Typically, a sensor node 106 transmits data to a given cluster node 102 at a power level that is as low as possible, or close to as low as possible. This conserves the power of the sensor node 106. The sensor node 106 may know a minimum transmission power level setting that enables the sensor node 106 to initiate communications with the cluster node 102 at a low power level. However, because the sensor nodes 106 and the cluster nodes 102 may be distributed in a random manner, a sensor node 106 does not know, a priori, with which cluster node 102 the sensor node 106 will communicate nor the sensor node 106 know, a priori, what power level will be necessary for communicating with the cluster node 102. Such information and cluster-unique sensor node identifier information and network node identifier information may be provided/determined/generated during cluster registration described below.

Similarly, in some embodiments, the cluster nodes 102 may transmit communications at variable power levels. Typically, a cluster node 102 transmits communications to another cluster node 102 at a power level that is as low as possible, or close to as low as possible. This conserves the power of the cluster node 102. The cluster node 102 may know a minimum transmission power level setting that enables the cluster node 102 to initiate communications with the other cluster node 102 at a low power level. However, because the cluster nodes 102 may be distributed in a random manner, a given cluster node 102 does not know, a priori, with which other cluster node 102 the given cluster node 102 will communicate nor the given cluster node 102 know, a priori, what power level will be necessary for communicating with the other cluster node 102. Such information and network node identifier information may be provided/determined/generated during network registration described below.

Figure 5:
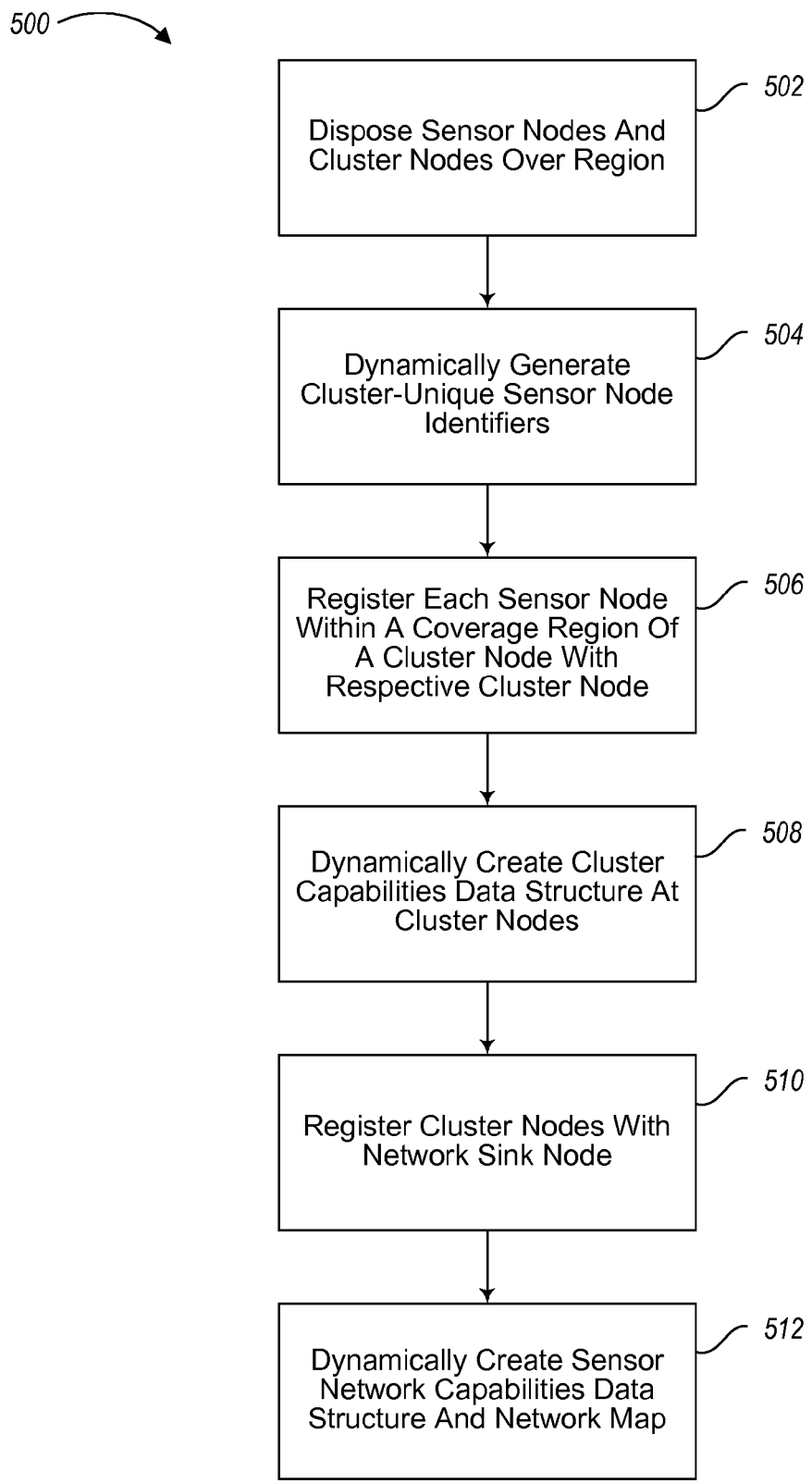
FIG. 5 is a flow diagram of a process to dynamically establish a sensor node network according to one non-limiting illustrated embodiment.

FIG. 5 shows a flow chart of an exemplary process 500 to establish the sensor network 100 according to one non-limiting illustrated embodiment.

At 502, the sensor nodes 106 and cluster nodes 102 are disposed over a region of interest. The sensor nodes 106 and cluster nodes 102 may be disposed in a deterministic manner or in a random manner. For example, in some embodiments, the sensor nodes 106 and cluster nodes 102 may be micro-sensors nodes and micro-cluster nodes. In that case, the sensor nodes 106 and cluster nodes 102 may be dispersed randomly by dropping them over a region of interest and allowing air currents to control where each one of the sensor nodes 106 and cluster nodes 102 lands.

At 504, cluster-unique sensor node identifiers are generated. Sensor nodes 106 that are in an intersection of two (or more) coverage regions 106 may have two (or more) sensor node identifiers, and each one of the sensor node identifiers is unique to a respective one of the coverage regions 106 that the sensor node 106 is within.

At 506, each sensor node within a respective coverage region 106 registers with the respective cluster node 102.

At 508, the cluster nodes 102 dynamically create or populate a respective cluster capabilities data structure.

At 510, the cluster nodes 102 register with the network sink node 108.

And, at 512, the network sink node 108 creates a sensor network capabilities data structure. The network sink node 108 may also create a network map.

Figure 6A:
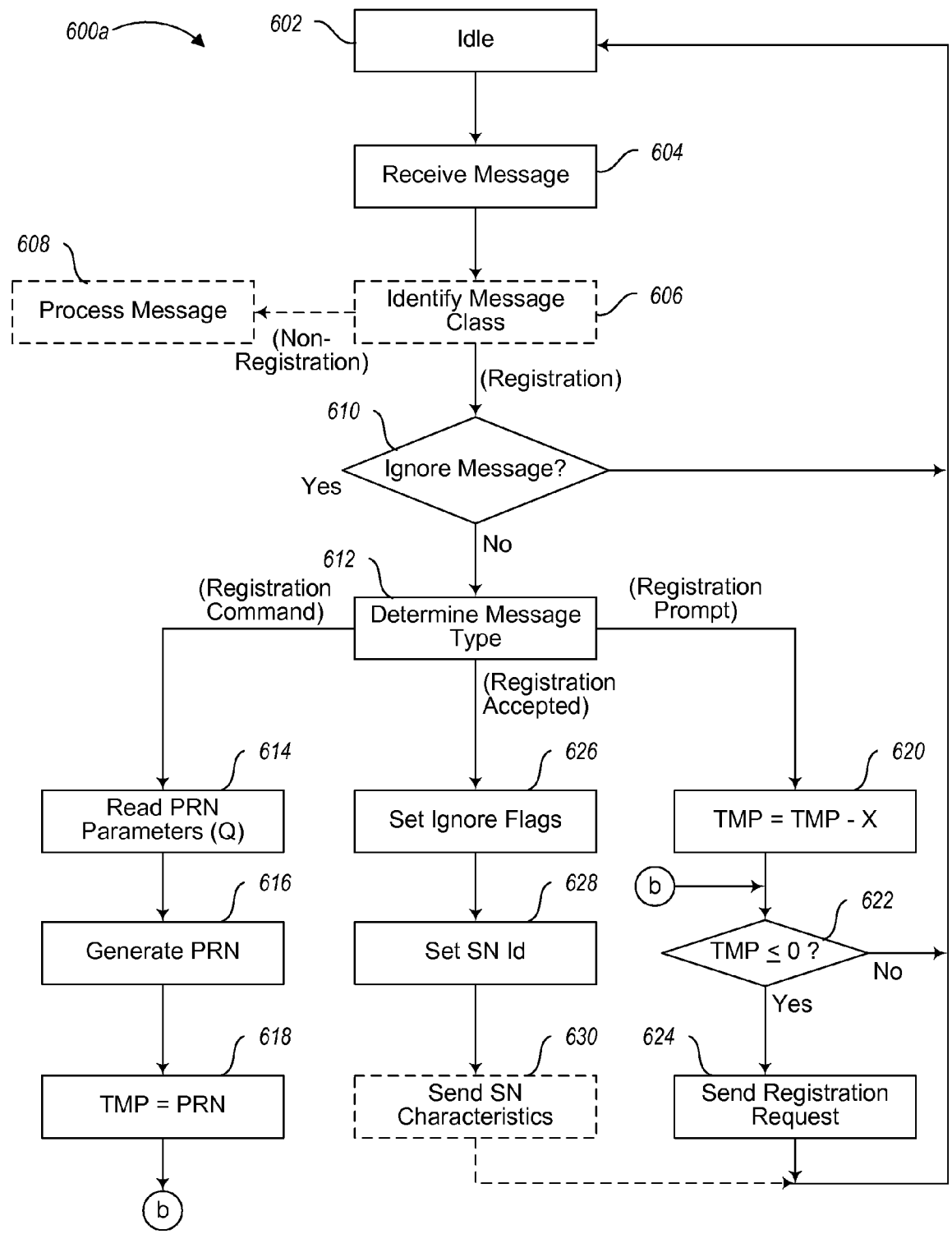
FIG. 6A is a flow diagram of a process implemented by a sensor node to dynamically register the sensor node according to a first non-limiting illustrated embodiment.
Figure 6B:
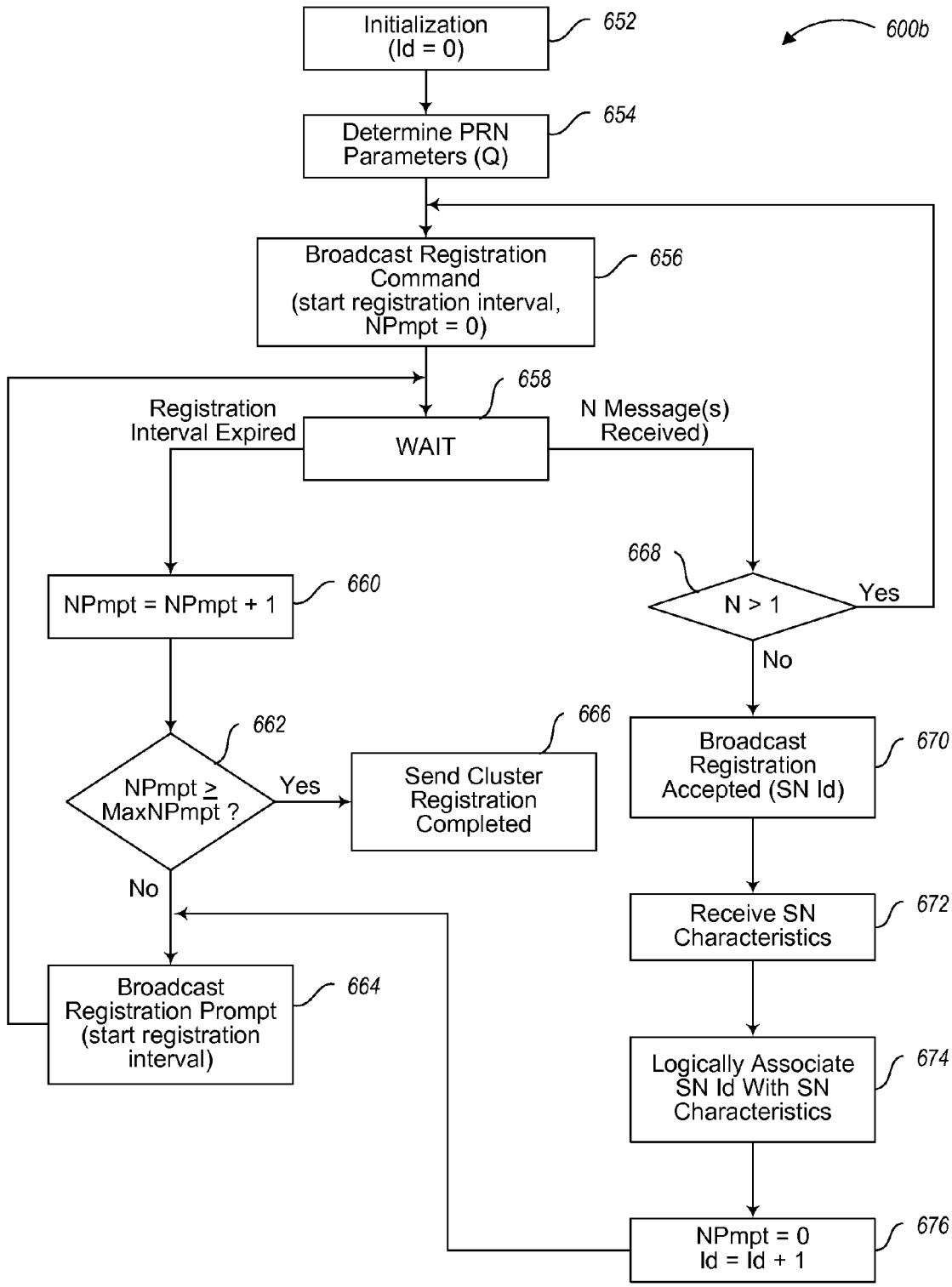
FIG. 6B is a flow diagram of a process implemented by a cluster node to dynamically register sensor nodes with the cluster node according to a first non-limiting illustrated embodiment.

FIG. 6A is a flow diagram of a process 600a implemented by a given sensor node 106 to dynamically register the given sensor node 102 according to a first non-limiting embodiment. FIG. 6B is a flow diagram of a process 600b which is complementary to the process 600a and which is implemented by a cluster node 102 to dynamically register the given sensor nodes 106 with the cluster node according to a first non-limiting embodiment. Processes 600a and 600b may work in parallel or in tandem. An action by one process may result in an action by the other process. Thus, processes 600a and 600b will be discussed together. In some embodiments, the processes 600a and 600b may be run in the background of the sensor nodes 106 and cluster node 102, respectively.

In this exemplary embodiment, the cluster node 102 generates and broadcasts various registration messages such as one or more registration command messages, registration prompt messages, and registration accepted messages. Only unregistered sensor nodes 106 respond to the registration command messages and the registration prompt messages. Only one of the unregistered sensor nodes 106 will respond to a registration accepted message.

The cluster node 102 will send an initial registration command and wait a period of time that makes up a registration interval before deciding on what to do next. If the cluster node 102 does not receive at least one registration request message during the registration interval, the cluster node 102 will send a registration prompt message and wait another registration interval before deciding on what to do next. The cluster node 102 will continue to send registration prompts until at least one unregistered sensor node 106 responds with a registration request message. If only one sensor node 106 responds to either a registration command or a registration prompt, then that sensor node 106 is assigned a sensor node identifier (SN Id) and becomes registered with the cluster node 102. If more than one sensor node 106 responds to either a registration command or a registration prompt during one registration interval, then the cluster node 102 sends a subsequent registration command message.

When an unregistered sensor node 106 receives a registration command, the sensor node 106 generates a pseudo random number and determines whether to send a registration request based at least partially on the pseudo random number. Each time an unregistered sensor node 106 receives a registration prompt, the sensor node 106 determines whether to send a registration request based at least partially upon the pseudo random number and/or the number of registration prompts received. If an unregistered sensor node 106 receives a subsequent registration command, the sensor node 106 generates a subsequent pseudo random number and determines whether to send a registration request based at least partially upon the subsequent pseudo random number.

Each time the cluster node 102 receives more than one registration request during a registration interval, the cluster node 102 broadcasts another registration command. If a given unregistered sensor node 106 determines to send a registration request and the given sensor node 106 is the only sensor node 106 to do so during the registration interval, then the cluster node 102 sends a registration accepted message to the given sensor node 106 and assigns the given sensor node 106 a SN Id, which is unique within the cluster.

Referring to FIG. 6A, at block 602, a given sensor node 106 may be idle, awaiting a registration message. Alternatively, the given sensor node 106 may be actively gathering data and awaiting the opportunity to register with a cluster node 102.

At block 604, the given sensor node 106 receives a message. At block 606, the sensor node 106 identifies the class of the message. If the message is a registration message, e.g., a registration command message, a registration prompt message, or a registration accepted message, the process continues at 610. Otherwise, the process continues at 608, where the sensor node 106 processes the received message. In some embodiments, blocks 606 and 608 may be optional. In some embodiments, the given sensor node 106 might not receive any type of message other than registration messages until after the registration process has been completed.

The process 600a is described in terms of a received registration message being: (1) a registration command message; (2) a registration prompt message; and (3) a registration accepted message.

1. Registration Command Message

At block 610, the given sensor node 106 determines the type of the received registration message. The first registration message received at the sensor node 106 will be a registration command message.

At block 614, upon receiving a registration command message, the given sensor node 106 reads the registration command message and in particular reads pseudo random parameters included in the registration command message.

At block 616, the given sensor node 106 generates a pseudo random number based upon the pseudo random number parameters from the cluster node 102. In this embodiment, all of the sensor nodes 106 may generate a respective pseudo random number (PRN) in the range of $(0, 2^Q-1)$, where Q is one of the pseudo random number parameters provided by the cluster node 102.

At block 618, the sensor node 106 sets a counter, TMP, to the value of the pseudo random number (PRN) generated by the given sensor node 106.

At block 622, the given sensor node 106 determines whether TMP is less than or equal to zero. In the event that TMP does equal zero, the process continues at block 624. Otherwise the process reverts back to block 602, where the given sensor node 106 awaits another message from the cluster node 102.

At block 624, the given sensor node 106 sends a registration request message to the cluster node 102. The process reverts back to block 602, where the given sensor node 106 awaits another message from the cluster node 102.

In response to a registration request, the given sensor node 106 will receive either a subsequent registration command message or a registration accepted message. The cluster node 102 sends/broadcasts a registration accepted message when only one of the sensor nodes 106 responds to a registration command (or the same registration prompt) message. The given sensor node 106 receives a subsequent registration command message whenever two or more sensor nodes 106 respond to the same registration command message (or the same registration prompt message).

The given sensor node 106 repeats blocks 614 through 618 and block 622, and possibly block 624, each time the given sensor node 106 receives a registration command message.

2. Registration Prompt Message

If none of the sensor nodes 106 sent a registration request to the cluster node 102, then once the registration interval expires, the cluster node 102 broadcasts a registration prompt message. All unregistered sensor nodes 106 respond to a registration prompt message.

At block 604, the given sensor node 106 receives a registration prompt message. At block 610, the sensor node 106 determines whether to ignore the registration prompt message. Registered sensor nodes 106 ignore registration prompt messages, and as of yet, the given sensor node 106 remains unregistered. At block 612, the given sensor node determines that the registration message is a registration prompt message.

At block 620, the given sensor node 106 decrements TMP by an amount X.

At block 622, the given sensor node 106 determines whether TMP is less than or equal to zero. Each unregistered sensor node 106 decrements its respective TMP value every time the respective sensor node 106 receives a registration prompt message. Thus, the respective TMP value of each of the unregistered sensor nodes 106 will eventually become less than or equal to zero. Consequently, all of the unregistered sensor nodes will eventually send a respective registration request message.

3. Registration Accepted Message

At block 604, the given sensor node 106 may receive a registration message, which is now described as being a registration accepted message. At block 610, the given sensor node 106 determines whether to ignore the registration accepted message. Unregistered sensor nodes 106 ignore registration accepted messages whenever their respective TMP values are greater than 0. Only the sensor node 106 that has a TMP value of less than or equal to zero will respond to the registration accepted message.

At block 626, the given sensor node 106 may set ignore flags so that the given sensor node 106 will ignore subsequent registration messages.

At block 628, the given sensor node 106 sets its SN Id to a value assigned by the cluster node 106. Typically, the registration accepted message includes the value of the SN id. The given sensor node 106 may also store the SN Id in the memory 116(b). The given sensor node 106 may include the SN Id in messages to the cluster node 102 (or to the network sink node 108).

At block 630, the sensor node 106 may send the cluster node 102 sensor node characteristics. The sensor node characteristics may include, among other things, information related to internal structure of the given sensor node 106, type of sensor, available memory, communication capabilities (MIMO), orthogonal codes, space block time code, CDMA, etc. and power source. In some embodiments, sensor node characteristics may be included in the registration request message.

Referring to FIG. 6B, at block 652, the cluster node 102 initializes parameters for registering sensor nodes 106. Among other parameters, the cluster node 102 may initialize a counter, Id counter, to zero, Id=0. The Id counter is used to assign SN Ids.

At block 654, the cluster node 102 determines pseudo random number parameters. The pseudo random number parameters may include a value Q that may be used by the sensor nodes 106 as an upper bound for determining a range of pseudo random numbers.

At block 656, the cluster node 102 broadcasts a registration command. The cluster node 102 also initiates a timer to clock a registration interval of time and sets a counter to zero, NPmpt=0. The counter NPmpt counts the number of times that the cluster node 102 sends a registration prompt message after having sent a registration command message.

At block 658, the cluster node 102 waits for a response to the broadcasted registration command message. There are two possible outcomes of block 658. The registration interval may expire before the cluster node 102 receives a response, or the cluster node 102 will receive at least one response during the registration interval. If the registration interval expires without a response, the process continues at block 660. Otherwise, the process continues at block 668.

At block 660, the cluster node 102 increments the counter NPmpt by 1, and at block 662, the cluster node 102 determines whether the counter NPmpt is greater than or equal to a maximum value, MaxNPmpt. Once all of the sensor nodes 106 within the respective coverage region 104 of the cluster node 102 have been registered with the cluster node 102, the cluster node 102 will not receive any responses to subsequent registration prompt messages (or registration command messages). Consequently, the counter NPmpt will eventually equal the maximum value, MaxNPmpt. When NPmpt is greater than or equal to MaxNPmpt, the process continues at block 666. The cluster node 102 may send a cluster registration completed message to the registered sensor nodes 106 at block 666. The cluster registration completed message may be a signal to the sensor nodes 106 to provide the cluster node 102 with data.

If the NPmpt is less than MaxNPmpt, the process continues at block 664. At block 664, the cluster node 102 broadcasts a registration prompt message to the sensor nodes 106 and re-initializes the timer to clock another registration interval. The process reverts back to block 658.

If at block 658 the cluster node 102 receives one or more registration request messages prior to the registration interval expiring, the process continues at block 668. At block 668, the cluster node 102 determines whether the number of received registration request messages was greater than 1. If so, more than one sensor node 106 responded to the same registration command message (or the same registration prompt message). In that case, the process reverts back to block 656, and the cluster node 102 broadcasts a subsequent registration command message.

On the other hand, if the number of received registration request messages is equal to 1, the process continues at block 670. At block 670, the cluster node 102 broadcasts a registration accepted message to the sensor nodes 106. The registration accepted message includes a value that is indicative of a SN Id assigned to the one sensor node 102 that sent the registration request message. The SN Id may be set to the current value of the Id counter, SN id=Id.

At block 672, the cluster node 102 receives sensor node characteristics. The sensor node characteristics may be included in the registration request message from the respective sensor node 106 or may be included in a subsequent message.

At block 674, the cluster node 102 logically associates the sensor node identifier (SN Id) with the received sensor node characteristics. The cluster node 102 may also maintain a registry of sensor node identifiers.

At block 676, the cluster node 102 resets the counter NPmpt to zero and increments the Id counter, Id=Id+1. The process reverts to block 664.

The embodiment described and illustrated in FIGS. 6A and 6B is only one exemplary embodiment in which the cluster node 102 may dynamically assign cluster-unique sensor node identifiers to sensor nodes 106. For example, in another embodiment, the cluster node 102 may employ a list of available unassigned cluster-unique sensor node identifiers and may randomly select one of the unassigned cluster-unique sensor node identifiers when registering one of the sensor nodes 106.

Figure 7A:
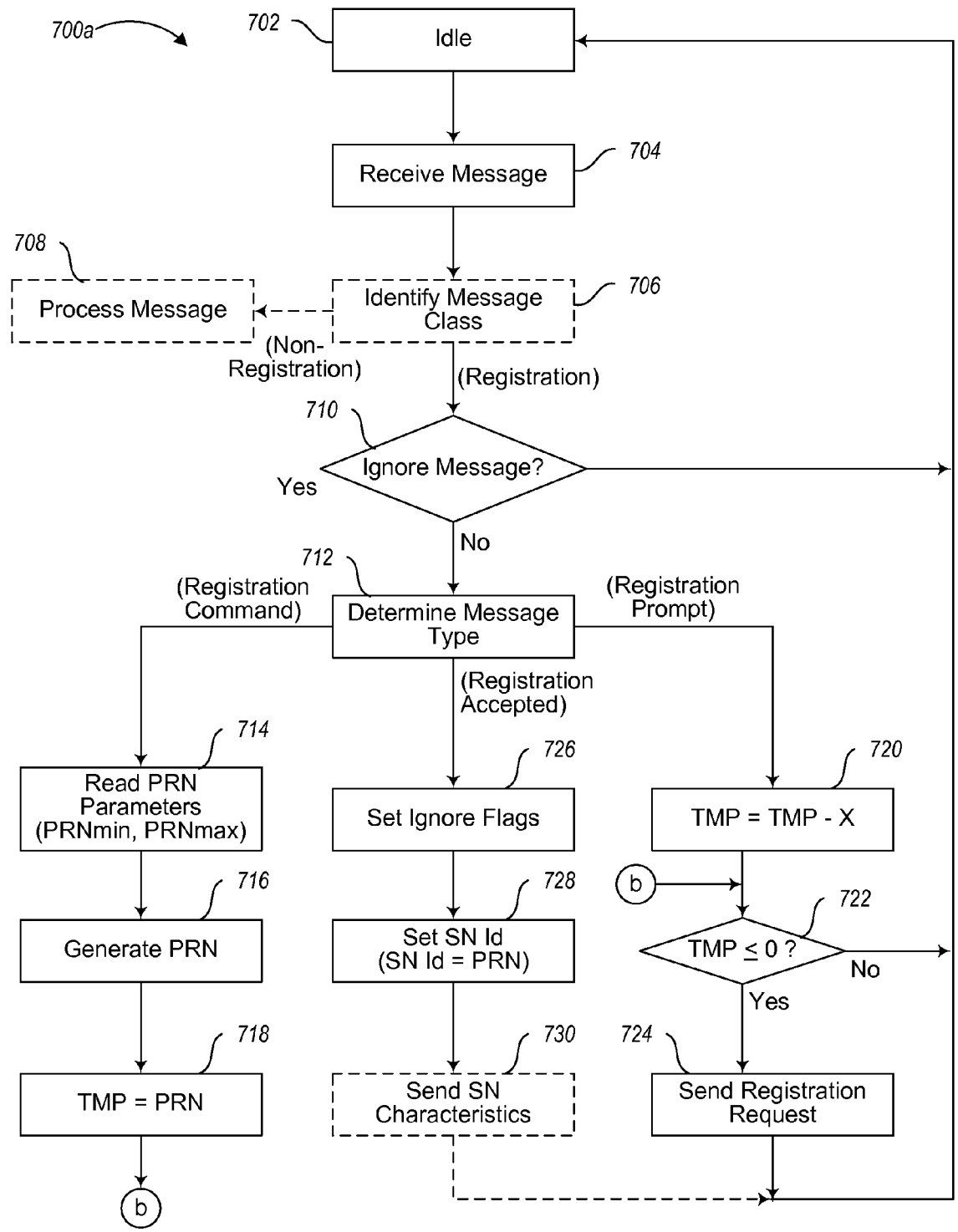
FIG. 7A is a flow diagram of a process implemented by a sensor node to dynamically register the sensor node according to a second non-limiting illustrated embodiment.
Figure 7B:
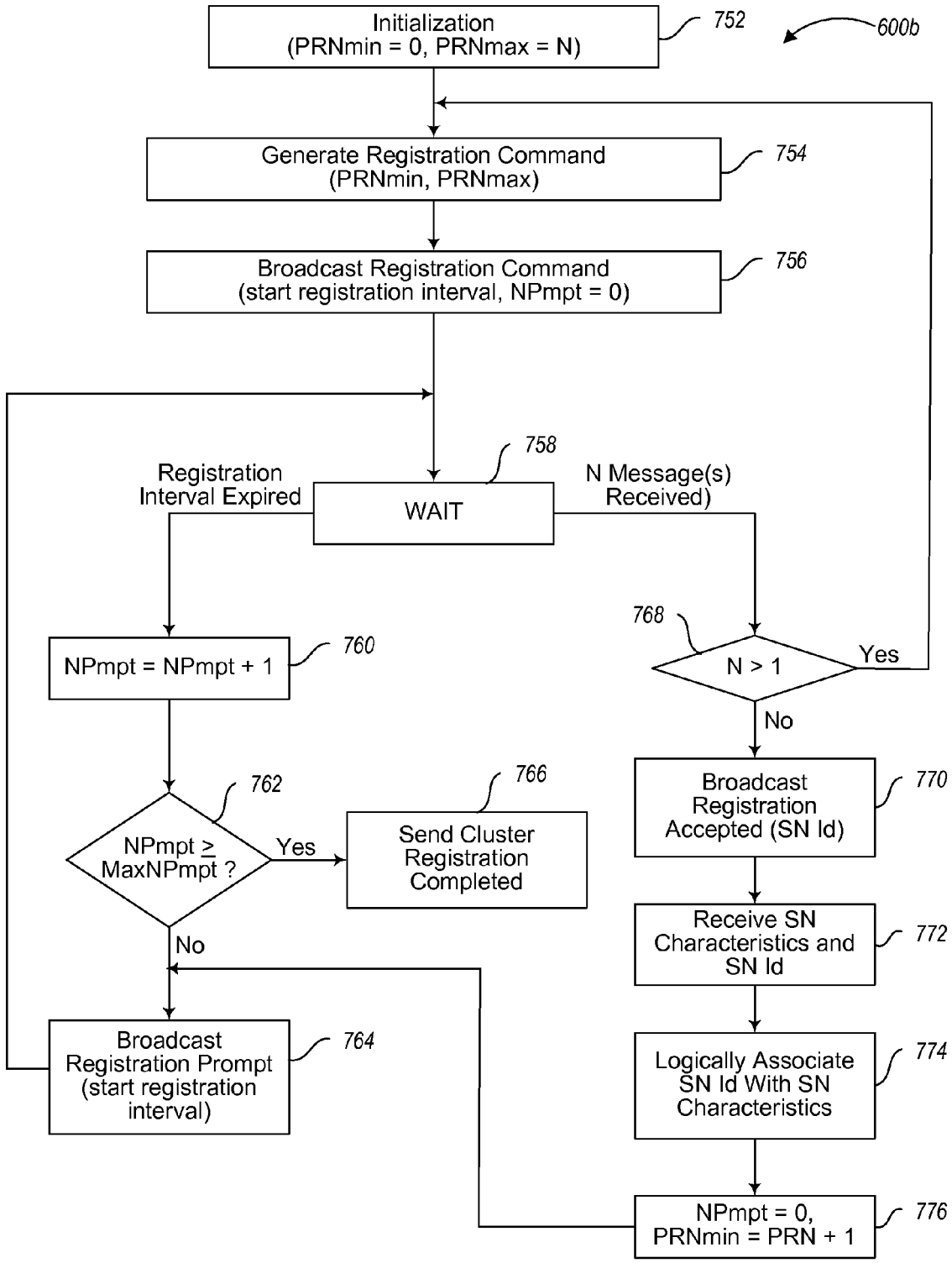
FIG. 7B is a flow diagram of a process implemented by a cluster node to dynamically register sensor nodes with the cluster node according to a second non-limiting illustrated embodiment.

FIG. 7A is a flow diagram of a process 700a implemented by a sensor node 106 to dynamically register the sensor node 106 according to a second non-limiting embodiment. FIG. 7B is a flow diagram of a process 700b which is complementary to the process 700a and which is implemented by a cluster node 102 to dynamically register the sensor node 106 with the cluster node 102 according to a second non-limiting embodiment. Processes 700a and 700b may work in parallel or in tandem. An action by one process may result in an action by the other process. In some embodiments, the processes 700a and 700b may be run in the background of the sensor nodes 106 and cluster node 102, respectively.

In this exemplary embodiment, the cluster node 102 generates and broadcasts various registration messages such as one or more registration command messages, registration prompt messages, and registration accepted messages. Only unregistered sensor nodes 106 respond to the registration command messages and the registration prompt messages. Only one of the unregistered sensor nodes 106 will respond to a registration accepted message.

The cluster node 102 will send an initial registration command and wait a registration interval of time before deciding what to do next. If the cluster node 102 does not receive at least one registration request message during the registration interval, the cluster node 102 will send a registration prompt message and wait another registration interval for at least one registration request message. The cluster node 102 will continue to send registration prompts until at least one unregistered sensor node 106 responds with a registration request message. If only one sensor node 106 responds to either a registration command or a registration prompt, then that sensor node 106 becomes registered with the cluster node 102. If more than one sensor node 106 responds to either a registration command message or a registration prompt message, then the cluster node 102 sends a subsequent registration command message.

When an unregistered sensor node 106 receives a registration command, the sensor node 106 generates a pseudo random number and determines whether to send a registration request based at least partially upon the pseudo random number. Each time an unregistered sensor node 106 receives a registration prompt message, the sensor node 106 determines whether to send a registration request based at least partially upon the pseudo random number and/or the number of registration prompts received. If an unregistered sensor node 106 receives a registration command message, the sensor node 106 generates a subsequent pseudo random number and determines whether to send a registration request message based at least partially upon the subsequent pseudo random number.

Each time the cluster node 102 receives more than one registration request message during a registration interval, the cluster node 102 broadcasts another registration command message. If a given unregistered sensor node 106 determines to send a registration request message and the given sensor node 106 is the only sensor node 106 to do so during a registration interval, then the cluster node 102 sends a registration accepted message to the given sensor node 106.

Referring to FIG. 7A, at block 702, a given sensor node 106 may be idle, awaiting a registration message. Alternatively, the given sensor node 106 may be actively gathering data and awaiting the opportunity to register with the cluster node 102.

At block 704, the given sensor node 106 receives a message. At block 706, the given sensor node 106 identifies the class of the message. If the message is a registration message, e.g., a registration command message, a registration prompt message, or a registration accepted message, then the process continues at 710. Otherwise, the process continues at 708, where the given sensor node 106 processes the received message. In some embodiments, blocks 706 and 708 may be optional. In some embodiments, the given sensor nodes 106 might not receive any type of messages other than registration messages until after the registration process has been completed.

The process 700a is described in terms of a received registration message being: (1) a registration command message; (2) a registration prompt message; and (3) a registration accepted message.

1. Registration Command Message

At block 710, the given sensor node 106 determines the type of the received registration message. The first registration message received at the sensor node 106 will be a registration command message.

At block 714, upon receiving a registration command message, the sensor node 106 reads the registration command and in particular reads pseudo random parameters included in the registration command. In this embodiment, pseudo random parameters may include PRNmin and PRNmax, which designate the lower and upper bound, respectively, for a range of pseudo random numbers.

At block 716, the sensor node 106 generates a pseudo random number based upon the pseudo random number parameters from the cluster node 102. In this embodiment, all of the sensor nodes 106 may generate a pseudo random number (PRN) in the range of PRNmin to PRNmax.

At block 718, the given sensor node 106 sets a counter, TMP, to the value of the pseudo random number (PRN) generated by the given sensor node 106.

At block 722, the given sensor node 106 determines whether TMP is less than or equal to zero. In the event that TMP does equal zero, the process continues at block 724. Otherwise the process reverts back to block 702, where the given sensor node 106 awaits another message from the cluster node 102.

At block 724, the given sensor node 106 sends a registration request message to the cluster node 102. The registration request message includes the PRN of the given sensor node 106. Afterwards, the process reverts back to block 702, where the sensor node 106 awaits another message from the cluster node 102.

In response to a registration request message, the given sensor node 106 will receive either a subsequent registration command message or a registration accepted message. The cluster node 102 sends/broadcasts a registration accepted message when only one of the sensor nodes 106 responds to a registration command (or the same registration prompt) message. The given sensor node 106 receives a subsequent registration command message whenever two or more sensor nodes 106 respond the same registration command message (or the same registration prompt message).

The given sensor node 106 repeats blocks 714 through 718 and block 722, and possibly block 724, each time the sensor node 106 receives a registration command message.

2. Registration Prompt Message

If none of the sensor nodes 106 sent a registration request message to the cluster node 102, then once the registration interval expires, the cluster node 102 broadcasts a registration prompt message. All unregistered sensor nodes 106 respond to registration prompt messages.

At block 704, the given sensor node 106 receives a registration prompt message. At block 710, the given sensor node 106 determines whether to ignore the registration prompt message. Registered sensor nodes 106 ignore registration prompt messages, and as of yet, the given sensor node 106 remains unregistered. At block 712, the given sensor node determines that the registration message is a registration prompt message.

At block 720, the given sensor node 106 decrements TMP by an amount X.

At block 722, the given sensor node 106 determines whether TMP is less than or equal to zero. Each unregistered sensor node 106 decrements its respective TMP value every time the respective sensor node 106 receives a registration prompt message. Thus, the respective TMP value of each of the unregistered sensor nodes 106 will eventually become less than or equal to zero. Consequently, all of the unregistered sensor nodes will eventually send a respective registration request message.

3. Registration Accepted Message

At block 704, the given sensor node 106 may receive a registration message, which is now described as being a registration accepted message. At block 710, the sensor node 106 determines whether to ignore the registration accepted message. The registration accepted message includes a value indicative of a sensor node identifier (SN Id); the value indicative of the SN Id may be the PRN of the sensor node 106 that sent the registration request message. Unregistered sensor nodes 106 having a PRN that does not match the value indicative of the SN Id ignore registration accepted messages. Only the sensor node 106 that has the PRN that matches the value indicative of the SN Id will respond to the registration accepted message.

At block 726, the given sensor node 106 may set ignore flags so that the sensor node 106 will ignore subsequent registration messages.

At block 728, the given sensor node 106 sets its SN Id to its PRN. The given sensor node 106 may also store the SN Id in the memory 116(b). The given sensor node 106 may include the SN Id in messages to the cluster node 102 (or to the network sink node 108).

At block 730, the given sensor node 106 may send the cluster node 102 sensor node characteristics. The sensor node characteristics may include, among other things, information related to internal structure of the given sensor node 106, type of sensor, available memory, communication capabilities (MIMO), orthogonal codes, space block time code, CDMA, etc. and power source. In some embodiments, sensor node characteristics may be included in the registration request message.

Referring to FIG. 7B, at block 752, the cluster node 102 initializes parameters for registering sensor nodes 106. Among other parameters, the cluster node 102 may initialize pseudo random parameters such as PRNmin and PRNmax.

At block 754, the cluster node 102 generates a registration command message and includes pseudo random number parameters such as PRNmin and PRNmax.

At block 756, the cluster node 102 broadcasts a registration command message. The cluster node 102 also initiates a timer to clock a registration interval of time and sets a counter to zero, NPmpt=0. The counter NPmpt counts the number of times that the cluster node 102 sends a registration prompt message after having sent a registration command message.

At block 758, the cluster node 102 waits for a response to the broadcasted registration command message. There are two possible outcomes of block 758. The registration interval may expire before the cluster node 102 receives a response, or the cluster node 102 will receive at least one response during the registration interval. If the registration interval expires without a response, the process continues at block 760. Otherwise, the process continues at block 768.

At block 760, the cluster node 102 increments the counter NPmpt by 1, and at block 762, the cluster node 102 determines whether the counter NPmpt is greater than or equal to a maximum value, MaxNPmpt. Once all of the sensor nodes 106 within the respective coverage region 104 of the cluster node 102 have been registered with the cluster node 102, the cluster node 102 will not receive any responses to subsequent registration prompt messages (or registration command messages). Consequently, the counter NPmpt will eventually equal the maximum value, MaxNPmpt. When NPmpt is greater than or equal to MaxNPmpt, the process continues at block 766. The cluster node 102 may send a cluster registration completed message to the registered sensor nodes 106 at block 766. The cluster registration completed message may be a signal to the sensor nodes 106 to provide the cluster node 102 with data.

If the NPmpt is less than MaxNPmpt, the process continues at block 764. At block 764, the cluster node 102 broadcasts a registration prompt message to the sensor nodes 106 and re-initializes the timer to clock another registration interval. The process reverts back to block 758.

If at block 758 the cluster node 102 receives one or more registration request messages prior to the registration interval expiring, the process continues at block 768. At block 768, the cluster node 102 determines whether the number of received registration request messages was greater than 1. If so, more than one sensor node 106 responded to the same registration command message (or the same registration prompt message). In that case, the process reverts back to block 756, and the cluster node 102 broadcasts a subsequent registration command message.

On the other hand, if the number of received registration request messages is equal to 1, the process continues at block 770. At block 770, the cluster node 102 broadcasts a registration accepted message to the sensor nodes 106. The registration accepted message may include a value that is indicative of a SN Id for the one sensor node 106 that sent the registration request message. The value indicative of the SN Id is the PRN of the sensor node 106 that sent the registration request message.

At block 772, the cluster node 102 receives sensor node characteristics with the SN Id of the sensor node. The sensor node characteristics may be included in the registration request message from the respective sensor node 106 or may be included in a subsequent message. If the sensor node characteristics are included in the registration request, the PRN of the registration request acts as the SN Id.

At block 774, the cluster node 102 logically associates the sensor node identifier (SN Id) with the received sensor node characteristics. The cluster node 102 may also maintain a registry of sensor node identifiers.

At block 776, the cluster node 102 resets the counter NPmpt to zero and PRNmin=PRN+1. PRNmin is set to be at least one greater than PRN of the most recently registered sensor node 106 so that if a subsequent registration command message is broadcast, the range of subsequent pseudo random numbers for the unregistered sensor nodes 106 will be higher than the value of the PRN of the most recently registered sensor node 106. This will prevent an unregistered sensor node 106 from generating a subsequent pseudo random number that is the same as an already registered sensor node 106. The process then reverts to block 764.

FIG. 8 is a diagram of an exemplary cluster capabilities data structure in the form of a table 130. In one embodiment, a cluster node 102 dynamically generates the cluster capabilities data structure 130 during the cluster registration process, e.g., while registering sensor nodes 106 that are within the coverage region 104 of the respective cluster node. Sensor nodes 106 may include their respective sensor node capabilities in their respective registration request message. In some embodiments, a cluster node 102 may broadcast/send a query to registered sensor nodes 106 after the sensor nodes 106 have been registered with the cluster node 106. In response to the query, registered sensor nodes 106 may provide respective sensor node capabilities. The cluster capabilities data structure 130 logically associates the sensor node identifier (SN Id) of a respective sensor node with the capabilities of the respective sensor node. Among other things, this allows the cluster node 102 (and/or the network sink node 108) to request specific data from a particular sensor node 106. In addition, the cluster capabilities data structure 130 may include a respective transmission power level setting for each registered sensor node 106. The transmission power level setting may be a normalized quantity and may represent a minimum power level threshold at which a respective sensor node 106 has previously communicated with the cluster node 102. The cluster node 102 (and/or the network sink node 108) may use transmission power level settings in determining which sensor node 106 to communicate with or from which sensor node 106 to request data. The cluster node 102 (and/or the network sink node 108) may decide not to utilize sensor nodes that have a high normalized communication power level so as to preserve their respective power sources 118.

Figure 9A:
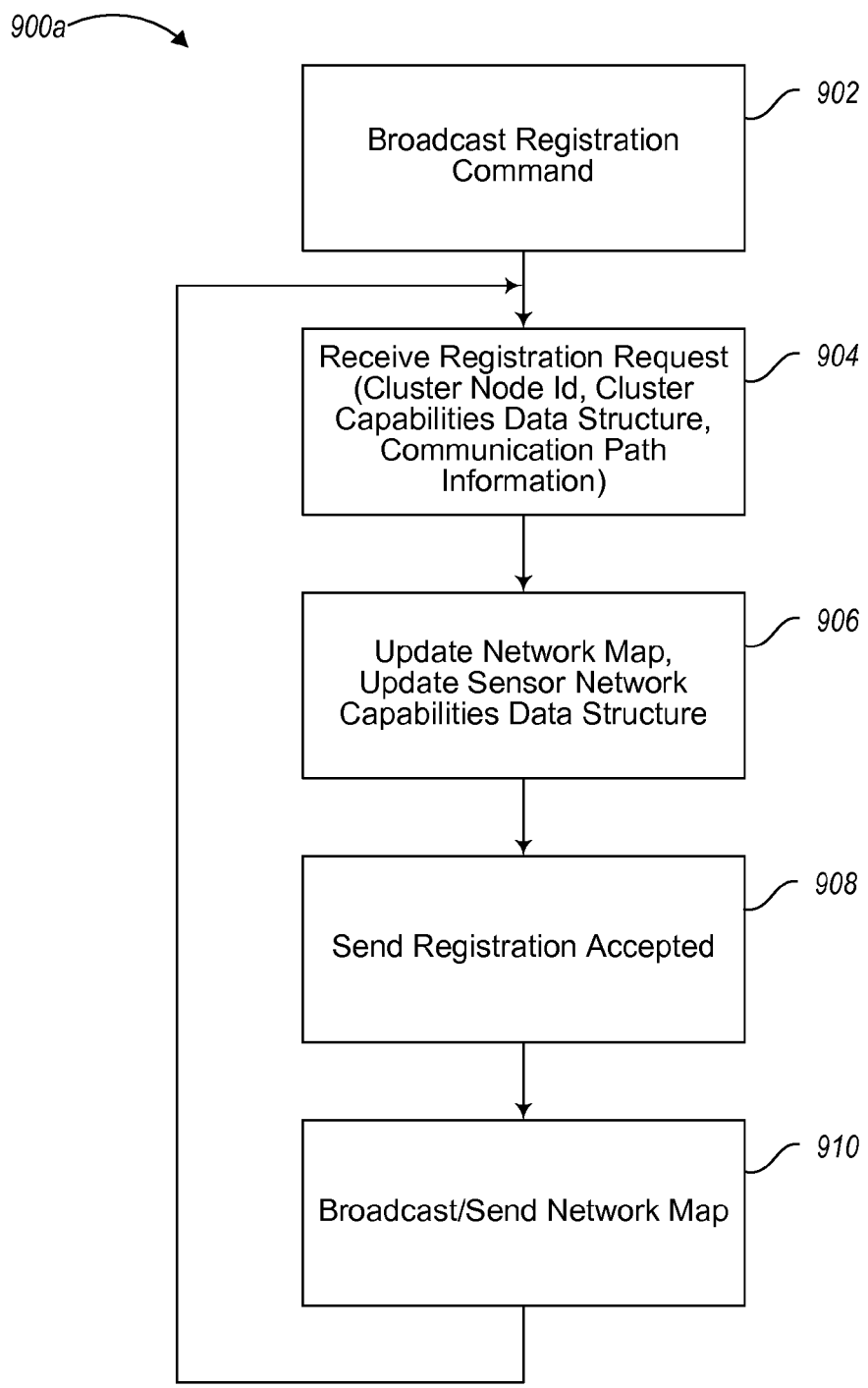
FIG. 9A is a flow diagram of a process implemented by a network sink node in dynamically establishing a sensor network according to a first non-limiting illustrated embodiment.
Figure 9B:
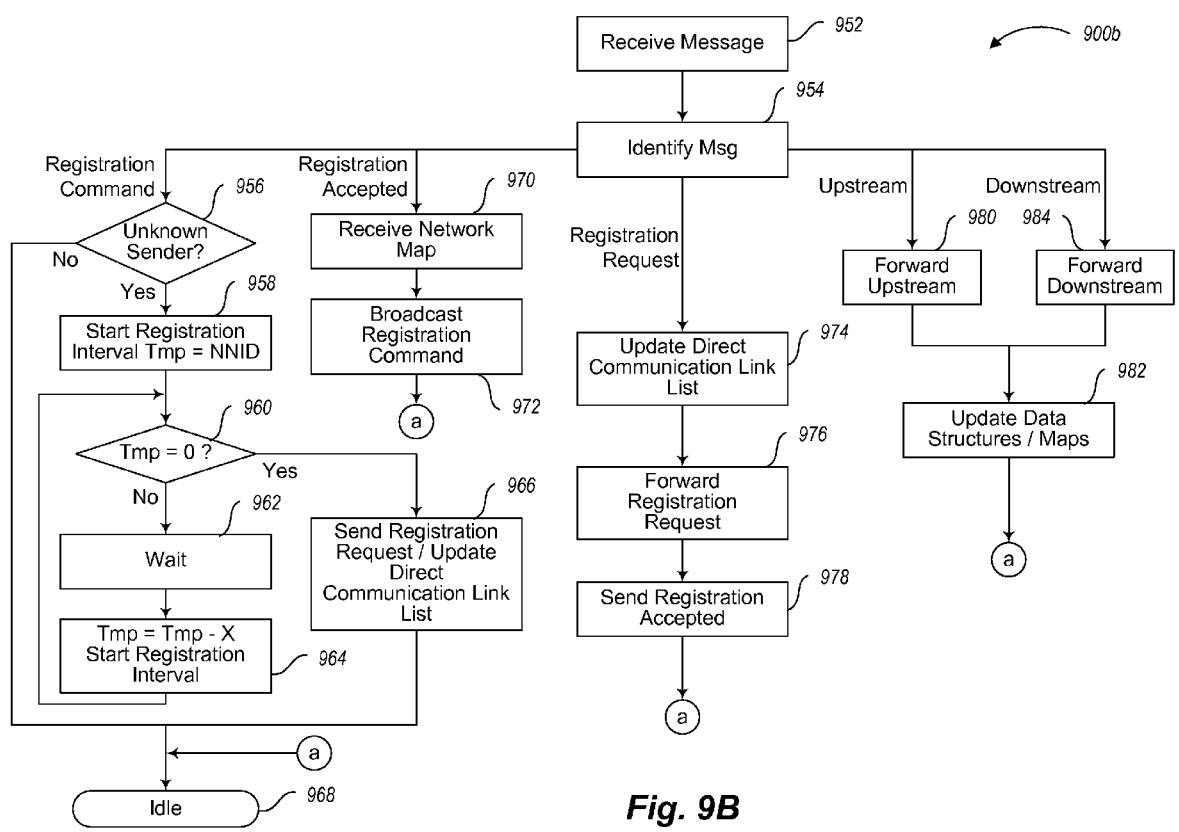
FIG. 9B is a flow diagram of a process implemented by a cluster node in dynamically establishing a sensor network according to a first non-limiting illustrated embodiment.

FIG. 9A is a flow diagram of a process 900a implemented by the network sink node 108 to dynamically register the cluster nodes 102 according to a first non-limiting embodiment. FIG. 9B is a flow diagram of a process 900b which is complementary to the process 900a and which is implemented by a cluster node 102 to dynamically register with the network sink node 108 according to a first non-limiting embodiment. Processes 900a and 900b may work in parallel or in tandem. An action by one process may result in an action by the other process. In some embodiments, the processes 900a and 900b may be run in the background of the network sink node 108 and the cluster nodes 102, respectively.

In this exemplary embodiment, each of the cluster nodes 102 has a respective unique network node identifier (NN Id) that may have been provided before deployment of the cluster nodes 102 and/or during manufacture of the cluster nodes 102.

Referring to FIG. 9A, at block 902, the network sink node 108 broadcasts a registration command message. In some situations, the registration command message might be received by only some of the cluster nodes 102. In particular, only the cluster nodes 102 that are within direct communication range of the network sink node 108 receive the broadcasted registration command message.

At block 904, the network sink mode receives registration request messages. The registration request messages may include information such as the network node identifier of the cluster node that initiated the registration request message, cluster capabilities information and/or cluster capabilities data structure 130 for the respective cluster node, direct communication link list of the respective cluster, and may also include communication path information (CPI). For a given registration request message, the communication path information may trace the path of the given registration request message. Direct communication link list may include information related to network node identifiers of the cluster nodes with which the respective cluster node is in direct communication.

At block 906, the network sink node 108 may update various tables or records, such as a network map and/or a sensor network capabilities data structure. The network sink node 108 may dynamically generate the network map based at least upon communication path information from registration requests and/or direct communication link lists. The network sink node 108 may dynamically generate the sensor network capabilities data structure based upon received cluster capabilities data structures.

At block 908, the network sink node 108 sends a respective registration accepted message in response to each registration request message.

At block 910, the network sink node 108 may broadcast/send the network map to the registered cluster nodes 102 and/or may send a partial network maps, e.g., maps of various branches of the sensor network 100.

After block 910, the process reverts to block 904.

In this embodiment, the cluster nodes 102 are registered with the network sink node 108 in waves. The first wave of cluster nodes 102 to register with the network sink node 108 are those that are in direct communication with the network sink node 108. These cluster nodes are the only ones to receive the registration command from directly from the network sink node 108 and are the first ones to provide the network sink node with their respective network node identifier, cluster capabilities data structure, etc.

After a given cluster node receives a registration accepted message from the network sink node, the given cluster node broadcasts a registration command message. The given cluster node then receives registration request messages from cluster nodes that are within in direct communication range. Each of the registration request messages may include information such as the network node identifier of the cluster node that initiated the registration request message, cluster capabilities data structure 130, direct communication link list, and may also include communication path information (CPI). The given cluster node then forwards the registration request message upstream, i.e., in the direction of the network sink node 108. The communication path information of the registration request shows each cluster node that forwarded the registration request. Using the communication path information and the direct communication link list the network sink node 108 is able to dynamically create a network map of all of the cluster nodes 106.

During the establishment of the sensor network 100, cluster nodes 102 send messages both downstream and upstream. The establishment of the sensor network 100 starts with registration of first-order cluster nodes 102, i.e., cluster nodes in direct communication (e.g., cluster nodes 102(1) and 102(2), see FIG. 1), and then proceeds downstream to second-order cluster nodes, i.e., cluster nodes that are in direct communication with first-order sensor nodes (e.g., cluster nodes 102(3), 102(4) and 102(5), see FIG. 1), and then further downstream to third-order cluster nodes, and so-on and so-on until all of the cluster nodes 102 have been registered.

First-order cluster nodes 102 receive a registration command message directly from the network sink node 108. Each one of the first-order cluster nodes registers with the network sink node 108. Each one of the first-order cluster nodes may start a respective direct communication link list with the network node identifier of the network sink node 108. The network sink node 108 starts to create a network map showing the first-order cluster nodes 102 being in direct communication with the network sink node 108. For example, the network map of the sensor network 100 shown in FIG. 1 would initially show that the network sink node 108 is in direct communication with the cluster nodes 102(1) and 102(2). In some embodiments, the network sink node 108 may provide the cluster nodes 102 with the network map or may provide portions of the network map such as a map of a branch in the network map to cluster nodes 102. Upon being registered with the network sink node 108, each first-order cluster node 102 may broadcast a respective registration command message. In the case of the sensor network 100 shown in FIG. 1, the first-order cluster nodes 102(1) and 102(2) would each broadcast a registration command message. The second-order cluster nodes 102 respond to a received registration command message and register with network sink node 102 through the first order-cluster node 102 that sent the registration command message. In the case of the sensor network 100 shown in FIG. 1, the second-order cluster node 102(3) registers with network sink node 108 through the first-order cluster node 102(1), and the second-order cluster nodes 102(4) and 102(5) register with the network sink node 108 through the first-order cluster node 102(2). The first-order cluster node 102(1) may update its direct communication link list to include the NN Id of the cluster node 102(3), and first-order cluster node 102(2) may update its direct communication link list to include the NN Id of the cluster node 102(4) and 102(5). Similarly, each of the second-order cluster nodes 102(3)-102(5) may initiate (or update) their own respective direct communication link list. During the registration process, each one of the first-order cluster nodes may pass information to the network sink node 108. The information passed upstream may include registration request messages from downstream cluster nodes, cluster capabilities data structures and direct communication link lists. In the case of the sensor network 100 shown in FIG. 1, the first-order cluster node 102(1) may forward to the network sink node 108 the registration request message from the cluster node 102(3). Similarly, first-order cluster node 102(2) may forward to the network sink node 108 the registration request messages from the cluster nodes 102(4) and 102(5). In addition, the first-order cluster node 102(1) may send the network sink node 108 direct network information such as direct communication link list, i.e., a list of all network node identifiers (NN Ids) of cluster nodes with which the cluster node 102(1) is in direct communication, which in this case is the NN Id of cluster node 102(3). Similarly, the first-order cluster node 102(2) may send the network sink node 108 network information such as direct communication link list, i.e., a list of the NN ids of cluster nodes 102(4) and cluster nodes 102(5). The network sink node 108 may then send registration accepted messages downstream to the first-order cluster nodes, which then pass the registration accepted messages downstream to the respective second-order cluster nodes. Upon receiving a registration accepted message, each one of the second-order cluster nodes may broadcast a registration command message. Upstream cluster nodes may ignore the broadcasted registration commands from downstream cluster nodes, and downstream cluster nodes will respond. Thus, the registration process is propagated downstream.

Referring to FIG. 9B, at block 952 a given cluster node receives a message. The direction of the message may be upstream (i.e., toward the network sink node 108) or downstream from the network sink node 108. Down stream messages include broadcast command messages, registration accepted messages, and network map messages. Upstream messages include registration request messages and broadcasted registration commands. Registration request messages may include, among other things, cluster capabilities data structures 130 and direct communication link lists, etc.

At block 954, the given cluster node 102 identifies the message type. If the message is a broadcasted registration command message, the process continues at block 956.

At block 956, the given cluster node 102 determines whether the broadcasted registration command message, which may include the NN Id of the sender, is from an unknown sender. The given cluster node 102 may check its direct communication link list to determine if the sender of the registration command message is known. If the sender is known to the given cluster node 102, the registration command message can be ignored. In that case, the process continues at block 968. If on the other hand, the sender is not known to the given cluster node 102, the process continues at block 958.

At block 958, the given cluster node 102 initiates a timer to clock a registration interval and sets a counter, TMP, to the value of the network node identifier for the cluster node 102, TMP=NN Id.

At block 960, the given cluster node 102 determines whether the TMP counter equals zero. If not, the process continues at block 962.

At block 962, the given cluster node 102 waits for the timer to expire. At block 964, the given cluster node 102 decrements the counter TMP and restarts the timer. The process reverts to block 960.

Blocks 960-964 repeat until the TMP counter equal zero. When the counter TMP equals zero, the process continues at block 966. At block 966, the given cluster node 102 sends a registration request message to the sender of the registration command message and updates/initiates its direct communication link list to include the NN Id of the sender of the broadcasted registration command message. The process then reverts to block 968.

When the given cluster node 102 receives a registration accepted message at block 952, the process continues at 970. At block 970, the given cluster node 102 may receive a network map and/or a portion of the network map. Block 970 may be optional in some embodiments.

At block 972, the given cluster node 102 broadcasts a registration command message. Thus, the given cluster node 102 initiates registration of downstream cluster nodes. The upstream cluster node (or network sink node 108) that registered the given cluster node will receive the broadcasted registration command message but may ignore it. The process then continues at 968.

Cluster nodes that are downstream from the given cluster node and that are within direct communication range of the given cluster node will respond to the registration command message.

At block 952, when the given cluster node receives a registration request message from a downstream cluster node, the process then continues at block 974. At block 974, the given cluster node updates its direct communication link list to include the NN Id of the downstream cluster node.

At block 976, the given cluster node forwards the registration request message upstream toward the network sink node 108. The registration request message from the downstream cluster node may include the cluster capabilities data structure 130 and the direct communications link list of the downstream cluster node.

At block 978, the given cluster node may send a registration accepted message to the downstream cluster node. In some embodiments, the registration accepted message may be initiated by the network sink node 108 and sent downstream to the given cluster node, which passes the registration accepted message downstream to the registering cluster node. The process then continues at block 968. The given cluster node will repeat blocks 974-978 for each downstream cluster node within direct communication range of the given cluster node.

Once the given cluster node has registered at least one downstream cluster node, the given cluster node may receive from the downstream cluster node registration request messages being forwarded to the network sink. At block 980, such messages are forwarded upstream. The given cluster node may use its network map or its portion of the network map to forward information toward the network sink node 108.

Similarly, the given cluster node may also receive messages for downstream cluster nodes. At block 984, downstream messages are forwarded downstream to a downstream cluster node. The given cluster node may use its network map or its portion of the network map to forward messages. In some embodiments, the network sink node 108 may include a network path for downstream communications. The network path may include the NN Id of the intended recipient of the message and may include the NN Id of each cluster node between the network sink node 108 and the intended recipient.

At block 982, the given cluster node may update stored information such as its network map based upon information contained in messages being forwarded. The process continues at block 968.

Figure 10A:
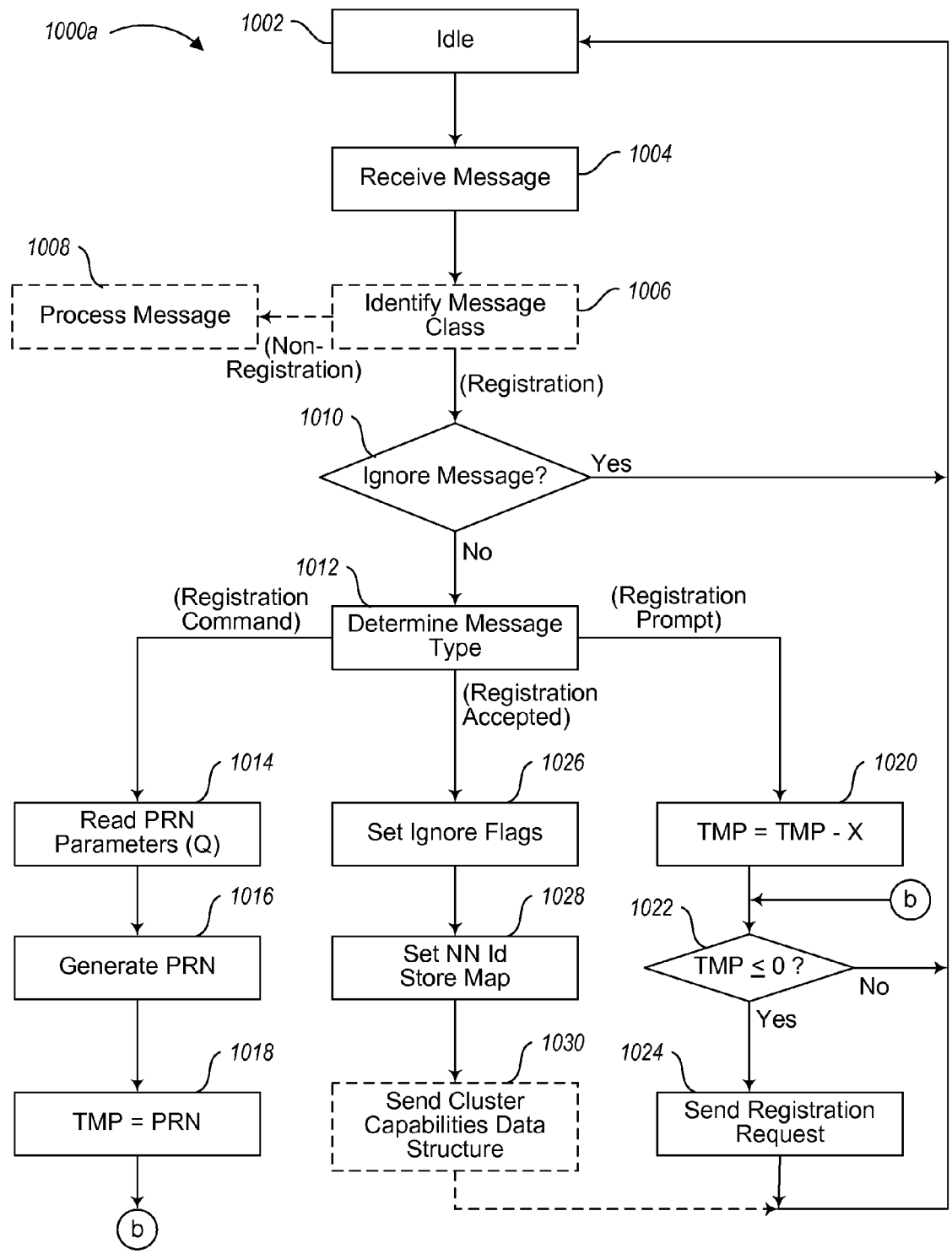
FIG. 10A is a flow diagram of a process implemented by a network sink node in dynamically establishing a sensor network according to a second non-limiting illustrated embodiment.
Figure 10B:
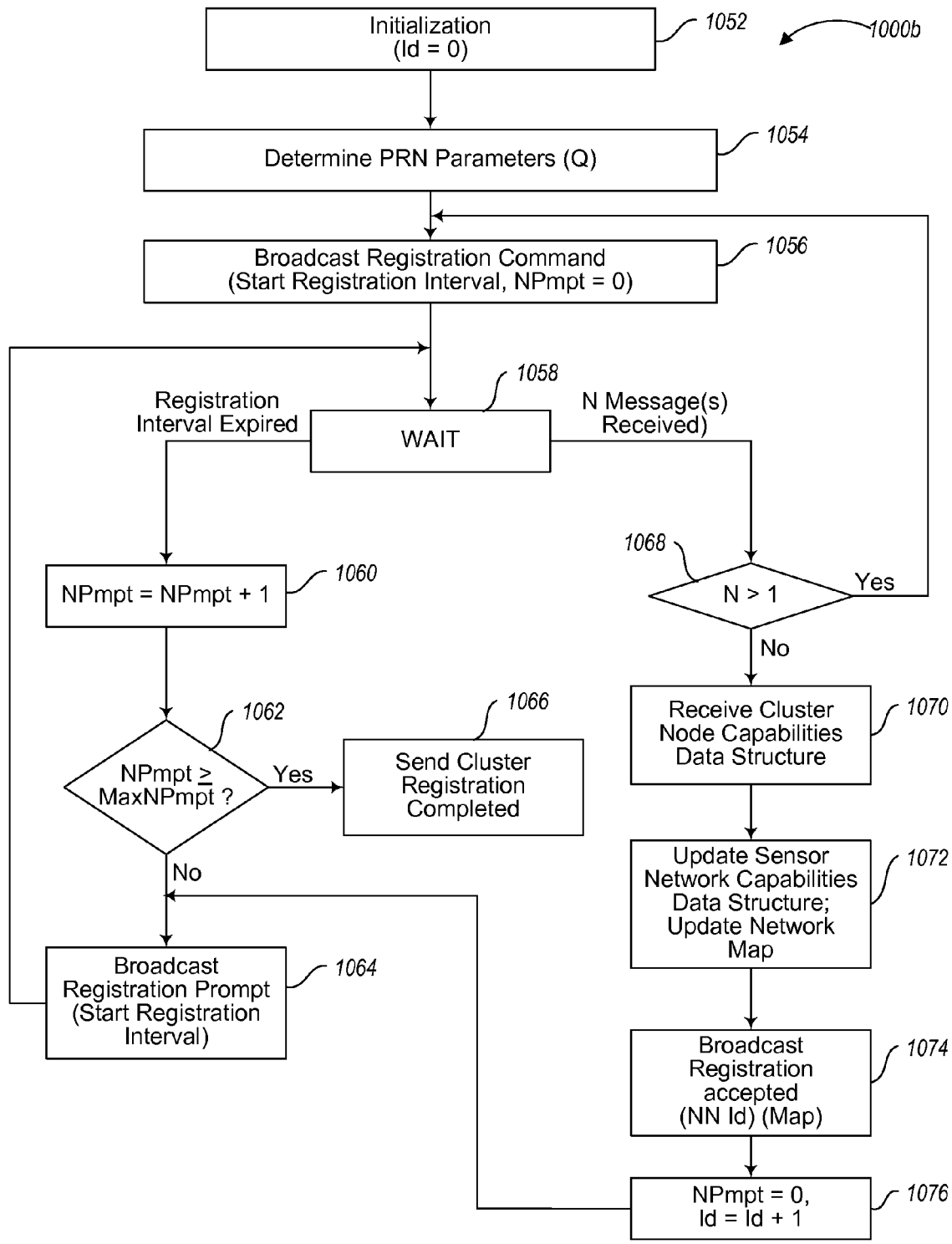
FIG. 10B is a flow diagram of a process implemented by a cluster node in dynamically establishing a sensor network according to a second non-limiting illustrated embodiment.

FIG. 10A is a flow diagram of a process 1000a implemented by a given cluster node 102 to dynamically register the given cluster node 102 with the network sink node 108 according to a second non-limiting embodiment. FIG. 10B is a flow diagram of a process 1000b which is complementary to the process 1000a and which is implemented by the network sink node 108 to dynamically register cluster nodes according to a second non-limiting embodiment. Processes 1000a and 1000b may work in parallel or in tandem. An action by one process may result in an action by the other process. In some embodiments, the processes 1000a and 1000b may be run in the background of the cluster nodes 102 and the network sink node 108, respectively. The processes 1000a and 1000b are similar to the processes 600a and 600b.

In this exemplary embodiment, each of the cluster nodes 102 is assigned a respective unique network node identifier (NN Id) by the network sink node 108. The network sink node 108 generates and broadcasts various registration messages such as one or more registration command messages, registration prompt messages, and registration accepted messages. Only unregistered cluster nodes 102 respond to registration command messages and the registration prompt messages. Only one of the unregistered cluster nodes 102 will respond to a registration accepted message. Cluster nodes may forward messages upstream and downstream.

Referring to FIG. 10A, at block 1002, a given cluster node 102 may be idle, awaiting a registration message. Alternatively, the given cluster node 102 may be actively gathering data and awaiting the opportunity to register with the network sink node 108.

At block 1004, the given cluster node 102 receives a message. At block 1006, the given cluster node 102 identifies the class of the message. If the message is a registration message, e.g., registration command message, registration prompt message, or registration accepted message, then the process continues at 1010. Otherwise, the process continues at 1008, where the given cluster node 102 processes the received message. In some embodiments, blocks 1006 and 1008 may be optional. In some embodiments, the given cluster nodes 102 might not receive any type of network message other than registration messages until after the registration process has been completed.

The process 1000a is described in terms of a received registration message being: (1) a registration command message; (2) a registration prompt message; and (3) a registration accepted message.

1. Registration Command Message

At block 1010, the given cluster node 102 determines the type of the received registration message. The first registration message received at the given cluster node 102 will be a registration command message.

At block 1014, upon receiving a registration command message, the given cluster node 102 reads the registration command and in particular reads pseudo random parameters included in the registration command.

At block 1016, the given cluster node 102 generates a pseudo random number using the pseudo random number parameters from the network sink node 108. In this embodiment, all of the cluster nodes 102 may generate a pseudo random number (PRN) in the range of $(0, 2^Q-1)$, where Q is one of the pseudo random number parameters provided by the network sink node 108.

At block 1018, the given cluster node 102 sets a counter, TMP, to the value of the pseudo random number (PRN).

At block 1022, the given cluster node 102 determines whether TMP is less than or equal to zero. In the event that TMP does equal zero, the process continues at block 1024. Otherwise the process reverts back to block 1002, where the given cluster node 102 awaits another message from the network sink node 108.

At block 1024, the given cluster node 102 sends a registration request message upstream to the network sink node 108. The process then reverts back to block 1002, where the given cluster node 102 awaits another message.

In response to a registration request message, the given cluster node 102 will receive either a subsequent registration command message or a registration accepted message. The network sink node 108 sends/broadcasts a registration accepted message when only one of the cluster nodes responds to a registration command message (or the same registration prompt message). The given cluster node 102 receives a subsequent registration command message whenever two or more cluster nodes 102 respond the same registration command message (or the same registration prompt message).

The given cluster node 102 repeats blocks 1014 through 1018 and block 1022, and possibly block 1024, each time the given cluster node 102 receives a registration command message.

2. Registration Prompt Message

If none of the cluster nodes 102 sent a registration request to the network sink node 108 during a registration interval of time, then the network sink node 108 broadcasts a registration prompt message. All unregistered cluster nodes 102 respond to a registration prompt message.

At block 1004, the given cluster node 102 receives a registration prompt message. At block 1010, the given cluster node 102 determines whether to ignore/forward the registration prompt message. Registered cluster nodes 102 forward registration prompt messages downstream. At block 1012, the cluster node determines that the registration message is a registration prompt message.

At block 1020, the given cluster node 102 decrements TMP by an amount X.

At block 1022, the given cluster node 102 determines whether TMP is less than or equal to zero. Each unregistered cluster node 102 decrements its respective TMP value each time the respective cluster node 102 receives a registration prompt message. Thus, the respective TMP value of each of the unregistered cluster nodes 102 will eventually become less than or equal to zero. Consequently, all of the unregistered cluster nodes will eventually send a respective registration request message.

3. Registration Accepted Message

At block 1004, the given cluster node 102 may receive a registration message, which is now described as being a registration accepted message. At block 1010, the given cluster node 102 determines whether to ignore/forward the registration accepted message. Unregistered cluster nodes 102 ignore registration accepted messages whenever their respective TMP value is greater than 0. Registered cluster nodes 102 forward registration accepted messages downstream. Prior to forwarding a registration accepted message, a registered cluster node may update information such as a stored network map based upon information included in the registration accepted message. Only the cluster node 102 that has a TMP value that is less than or equal to zero than will respond to the registration accepted message.

At block 1026, the given cluster node 102 may set ignore flags so that the given cluster node 102 will ignore/forward subsequent registration messages.

At block 1028, the given cluster node 102 sets its NN Id to a value assigned by the network sink node 108. Typically, the registration accepted message includes the value of the NN Id. The given cluster node 102 may also store the NN Id in the memory 116(*b*). The given cluster node 102 may include the NN Id in messages to the network sink node 108 (or to the network sink node 108). In some embodiments, the registration accepted message may include a current network map or a portion of a current network map. The network map will evolve as cluster nodes 102 register with the network sink node 108. The given cluster node 102 may store the current network map in the memory 116(*a*).

At block 1030, the cluster node 102 may send the network sink node 108 cluster node characteristics. The cluster node characteristics may include, among other things, information related to internal structure of a cluster node 102, type of sensor, available memory, communication capabilities (MIMO), orthogonal codes, space block time code, CDMA, etc. and power source. In some embodiments, cluster node capabilities data structure and direct communication link list may be included in the registration request message.

Referring to FIG. 10B, at block 1052, the network sink node 108 initializes parameters for registering cluster nodes 102. Among other parameters, the network sink node 108 may initializes an Id counter to zero, Id=0. The Id counter may be used to assign network node identifiers, NN Ids.

At block 1054, the network sink node 108 determines pseudo random number parameters. The pseudo random number parameters may include a value Q which may be used by the cluster nodes 102 as an upper bound for determining a range of pseudo random numbers.

At block 1056, the network sink node 108 broadcasts a registration command message. The network sink node 108 also initiates a timer to clock a registration interval of time and sets a counter to zero, NPmpt=0. The counter NPmpt counts the number of times that the network sink node 108 sends a registration prompt message after having sent a registration command message.

At block 1058, the network sink node 108 waits for a response to the broadcasted registration command message. There are two possible outcomes of block 1058. The registration interval may expire before the network sink node 108 receives a response 102, or the network sink node 108 will receive at least one response during the registration interval. If the registration interval expires, the process continues at block 1060. Otherwise, the process continues at block 1068.

At block 1060, the network sink node 108 increments the counter NPmpt by 1, and at block 1062, the network sink node 108 determines whether the counter NPmpt is greater than or equal to a maximum value, MaxNPmpt. Once all of the cluster nodes have been registered with the network sink node 108, the network sink node 108 will not receive any responses to subsequent registration prompt messages (or registration command messages), and consequently, the counter NPmpt will eventually equal the maximum value, MaxNPmpt. Once NPmpt is equal to or greater than MaxNPmpt, the process continues at block 1066. The network sink node 108 may send a cluster registration completed message to the registered cluster nodes 102 at block 1066. The cluster registration completed message may be a signal to the cluster nodes 102 to provide the network sink node 108 with data.

If the NPmpt is less than MaxNPmpt, the process continues at block 1064. At block 1064, the network sink node 108 broadcasts a registration prompt message to the cluster nodes 102 and re-initializes the registration interval. The process reverts back to block 1058.

If at block 1058 the network sink node 108 receives one or more registration request messages prior to the registration interval expiring, the process continues at block 1068.

At block 1068, the network sink node 108 determines whether the number of received registration request messages was greater than 1. If so, more than one cluster node 102 responded to a registration command message (or a registration prompt message). In that case, the process reverts back to block 1056, and the network sink node 108 broadcasts a subsequent registration command message.

On the other hand, if the number of received registration request messages is equal to 1, the process continues at block 1070.

At block 1070, the network sink node 108 receives cluster node characteristics, which may be in the form of cluster capabilities data structure 130. The cluster node characteristics may be included in the registration request message from the respective cluster node 102 or may be included in a subsequent message.

At block 1072, the network sink node 108 sets a NN Id to the value of the Id counter, NN Id=Id. The NN Id is assigned to the cluster node that sent the registration request. The network sink node 10 logically associates the network node identifier (NN Id) with the received cluster node characteristics. The network sink node 108 may also maintain a registry of network node identifiers. The network sink node 108 also updates a network map based upon information, such as direct communication link list or other information that may be included in the registration request.

At block 1074, the network sink node 108 broadcasts a registration accepted message to the cluster nodes 102. The registration accepted message includes a value that is indicative of the NN Id assigned to the cluster node 102 that sent the registration request message. In some embodiments, the registration accepted message may include a current network map or a portion of a current network. The network map will evolve as more cluster nodes 102 register with the network sink node 108.

At block 1076, the network sink node 108 resets the counter NPmpt to zero and increments the counter Id, Id=Id+1. The process reverts to block 1064.

The embodiment described and illustrated in FIGS. 10A and 10B is only one exemplary embodiment in which the network sink node 108 may dynamically assign cluster-unique network node identifiers to cluster nodes 102. For example, in another embodiment, the network sink node 108 may employ a list of available unassigned cluster-unique network node identifiers and may randomly select one of the unassigned cluster-unique network node identifiers when registering one of the cluster nodes 102.

In another embodiment, the registration process of the cluster nodes 102 with the network sink node 108 may be similar to the registration process of sensor nodes 106 with a cluster node 102 as shown in FIGS. 7A and 7B.

FIG. 11 is a diagram of an exemplary sensor network capabilities data structure in the form of a sensor network capabilities table 140. In one embodiment, the network sink node 108 dynamically generates or populates the sensor network capabilities data structure 140 during the cluster registration process, e.g., while registering cluster nodes 102. The cluster nodes 102 may include their respective cluster capabilities data structure 130 in their respective registration request message. In some embodiments, the network sink node 108 may send/broadcast a query to cluster nodes 102 after the cluster nodes 102 have been registered with the network sink node 108. In response to the query, cluster nodes 102 may provide their respective cluster capabilities data structure 130. The sensor network capabilities data structure 140 logically associates the network node identifier (NN Id) of a respective cluster node with the capabilities of the respective cluster and logically associates sensor node capabilities with sensor node identifiers (SN Ids). Among other things, this allows the network sink node 108 to request specific data from a particular cluster or a particular sensor node 106. For example, the network sink node 108 may send a message to a specific sensor node 106 by including in the address of the message the SN Id of the specific sensor node 106 and the NN Id of the cluster node 102 with which the specific sensor node 106 is registered. In addition, the sensor network capabilities data structure 140 may include transmission power level setting for each cluster node 102. The transmission power level setting may be a normalized quantity and may represent a minimum power level at which a respective cluster node 102 has previously communicated with the network sink node 108. The sink node 108 may use transmission power level settings in determining which cluster node 102 to communicate with or from which cluster node 102 to request data.

Figure 12:
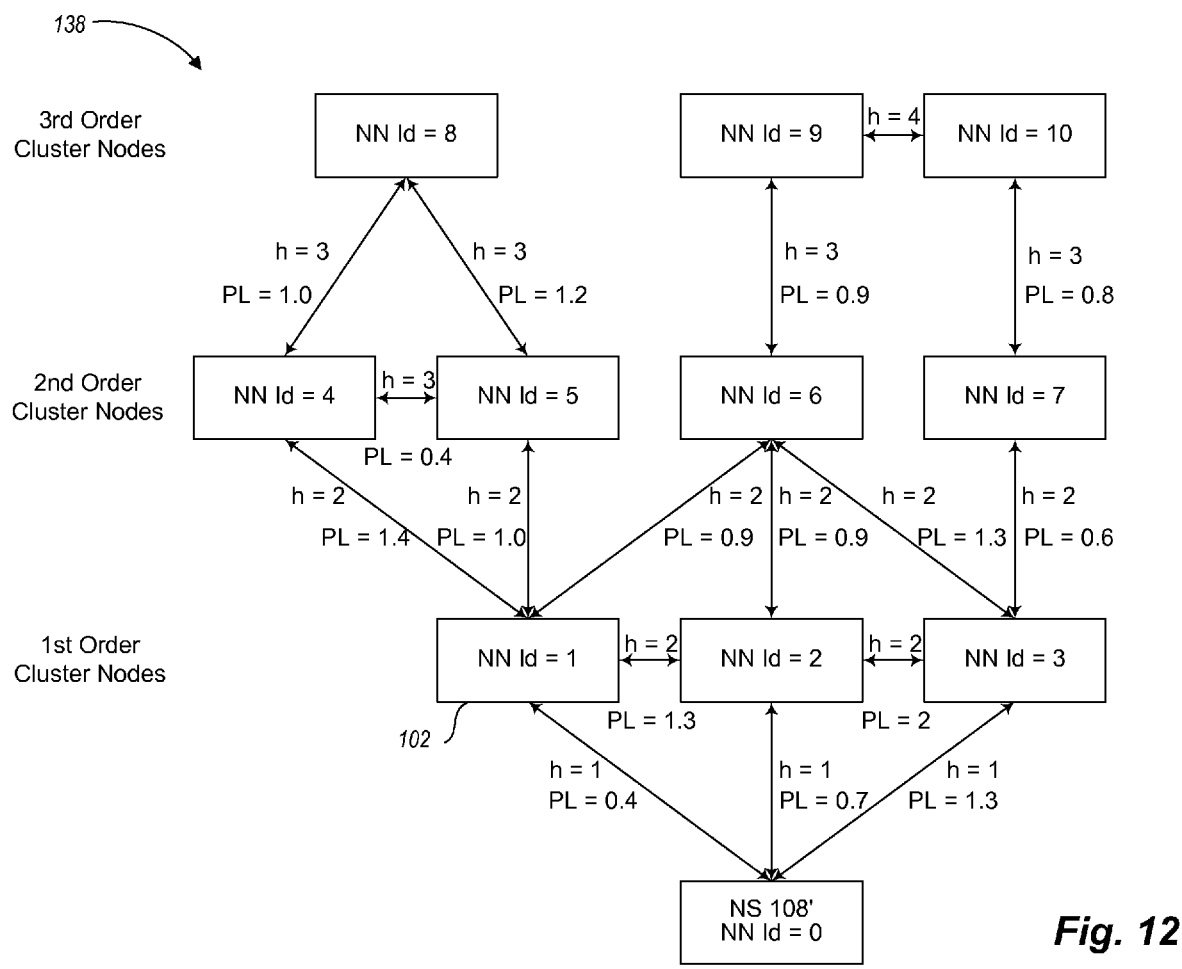
FIG. 12 is a diagram of an exemplary network map according to one non-limiting illustrated embodiment.

FIG. 12 is a diagram of an exemplary network map 138 according to one non-limiting illustrated embodiment. The network map 138 shows the direct communication links between pairs of various network devices, such as cluster nodes 102, which are identified by their respective network node identifier, and the network sink node 108. The network map 1200 shows the minimum number of hops needed for a communication from a respective one of the cluster nodes 102 to the network sink node 108. The minimum number of hops is shown for each communication link of each cluster node 102. Typically, a cluster node will send or forward a message intended for the network sink node 108 along a communication path having the fewest number of hops.

The network map 138 also shows a normalized transmission power level (PL) setting for each one of the communication links. In some embodiments, the network map 138 may show normalized transmission power level setting per node for each of the communication links. The normalized transmission power level setting for a communication link may be related to a power level of a prior transmission between the pair of network nodes that make up the communication link. The normalized transmission power level setting may be used as an initial power level setting that may then be adjusted up or down. Network node devices (e.g., network sink node 108 and cluster nodes 102) may make routing determinations based in part on the normalized transmission power level settings. For example, if a cluster node may send a communication packet to an intended recipient along two paths that have the same number of hops, but the aggregate normalized transmission power level setting for one path is lower than the aggregate normalized transmission power level setting for other path, the cluster node may decide to send the communication packet along the path having the lower aggregate normalized transmission power level settings.

Figure 13:
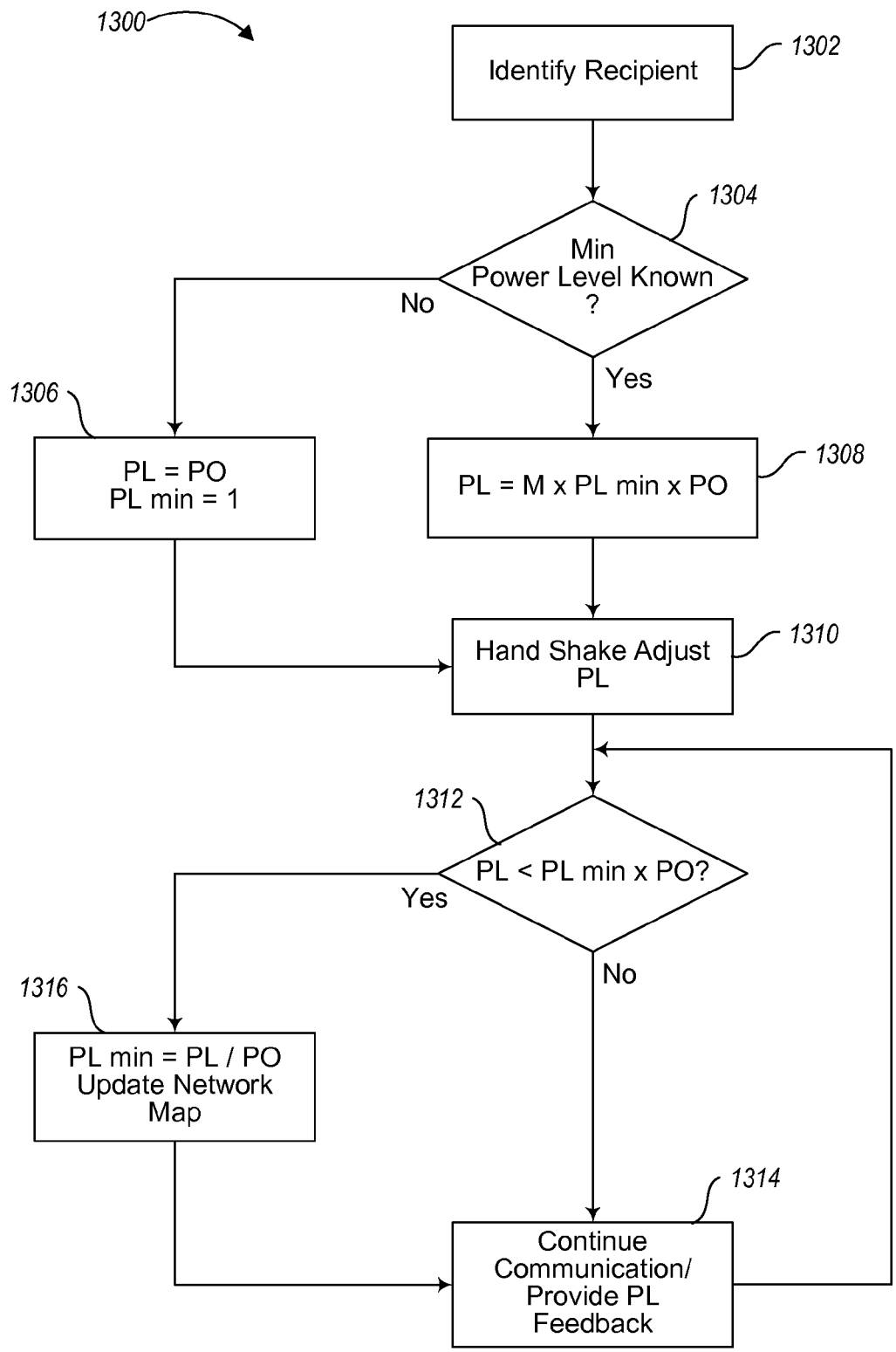
FIG. 13 is a flow diagram of a process to control transmission power level during communications according to one non-limiting embodiment.

FIG. 13 is a flow diagram of a process 1300 to control transmission power level during a communication according to one non-limiting embodiment. The process 1300 is described in terms of a cluster node communicating with another network node such as another cluster node or the network sink node 108. However, the same principles may be applied to communications between a sensor node and a cluster node.

At the block 1302, a given cluster node identifies a recipient of a communication.

At block 1304, the given cluster node may use the network map 138 or other information to determine whether the given cluster node knows an initial minimum transmission power level setting for communications to the recipient. If the decision at block 1304 is negative, the process continues at block 1306. Otherwise, the process continues at block 1308.

At block 1306, the given cluster node sets an initial transmission power level setting to a default value, PL=P0, and sets a normalized minimum transmission power level setting to 1, PLmin=1. PLmin may be normalized with respect to P0.

At block 1308, the given cluster node sets the initial transmission power level setting, PL, based upon a previously determined normalized minimum transmission power level setting. In this case, the initial transmission power level setting is set to (m)×(PLmin)×(P0), where m is normally greater than or equal to 1. Multiplying PLmin by P0 produces a minimum transmission power level setting that is not normalized. The multiplication by m is done to assure that the initial transmission power level setting is sufficiently high such that the intended recipient will receive the communication.

At block 1310, the given cluster node begins the transmission of the communication. The given cluster node and the recipient begin handshaking. During the handshaking, the given cluster node may adjust the current transmission power level setting.

At block 1312, the given cluster node determines whether the current transmission power level setting is less than the product of PLmin and P0. If not, the process continues at block 1314. Otherwise, the process continues at block 1316.

At block 1316, given cluster node determines a new normalized transmission power level setting, e.g., PLmin=PL/P0. The given cluster node may store the new normalized transmission power level setting in memory 116(*a*) and/or update its network map to reflect the new normalized transmission power level setting.

At block 1314, the given cluster node continues communications with the recipient. The given cluster node may provide transmission power level feedback to the recipient such that the recipient may dynamically control the power level setting at which it transmits. Similarly, the given cluster node may receive transmission power level feedback from the recipient. Based upon transmission power level feedback from the recipient, the given cluster node may increase or decrease the current transmission power level setting. In the embodiment illustrated, with m>1, the given cluster node normally begins communicating at a transmission power level that is higher than necessary for communications with the recipient and then decreases the power level.

The process reverts back to block 1312, where the given cluster node continues to monitor the current transmission power level setting.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other sensor networks, not necessarily the exemplary sensor networks generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application entitled, SYSTEMS, METHODS AND DEVICES FOR COLLECTING DATA FROM WIRELESS SENSOR NODES, filed concurrently with the present disclosure are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of establishing a low-power sensor network comprising:
   wirelessly registering at each cluster node of a plurality of cluster nodes a number of sensor nodes physically located within a respective coverage region of the respective cluster node, wherein the number of sensor nodes physically located within the respective coverage region of the respective cluster node and the respective cluster node make up a respective cluster;
   associating at each cluster node at least one characteristic of a respective sensor node in the respective cluster with a respective cluster-unique sensor node identifier; and
   wirelessly registering at a network sink node each cluster node of the plurality of cluster nodes with the network sink, including:
      creating at the network sink node a network map representing direct communication links between respective pairs of cluster nodes of the plurality of cluster nodes;
      associating at the network sink node each cluster node of the plurality of cluster nodes with a respective unique network node identifier; and
      associating at the network sink node each network node identifier with a respective minimum transmission hop count for a communication transmitted upstream from the respective cluster node associated with the respective network node identifier to the network sink node.

2. The method of claim 1 further comprising:
   providing each of the cluster nodes of the plurality of cluster nodes with at least a respective portion of the network map.

3. The method of claim 1, further comprising:
   dynamically generating the respective unique network node identifier at the cluster node.

4. The method of claim 1, further comprising:
   dynamically generating the respective unique network node identifier at the network sink node.

5. The method of claim 1 wherein wirelessly registering at each cluster node of a plurality of cluster nodes a number of sensor nodes physically located within a respective coverage region of the respective cluster node includes:
   dynamically generating at each cluster node the respective cluster-unique sensor node identifier for each sensor node in the respective cluster.

6. The method of claim 1 wherein wirelessly registering at each cluster node of a plurality of cluster nodes a number of sensor nodes physically located within a respective coverage region of the respective cluster node includes:
   dynamically generating at each sensor node in a respective cluster the respective cluster-unique sensor node identifier.

7. The method of claim 1 wherein wirelessly registering at a network sink each cluster node of the plurality of cluster nodes with the network sink further includes:
   dynamically generating the respective cluster-unique sensor node identifier for each sensor node in the respective cluster.

8. A micro-structure sensor network comprising:
   a network sink node having a memory with a network sensor capabilities data structure stored therein and configured to communicate wirelessly;
   a plurality of cluster nodes, each cluster node configured to wirelessly communicate with the network sink node and with other cluster nodes of the plurality of cluster nodes, and each cluster node having a respective network node identifier associated therewith;
   a plurality of micro-structure sensor nodes, each sensor node having at least one characteristic and being in direct wireless communication with a number of cluster nodes and having a memory with the same number of network node identifiers and the same number of dynamically generated cluster-unique sensor node identifiers stored therein, wherein the network sensor capabilities data structure carries information for each sensor node that is indicative of the respective at least one characteristic of the respective sensor node and associates the respective at least one characteristic with at least one respective cluster-unique sensor node identifier.

9. The micro-structure sensor network of claim 8 wherein the memory of the network sink node has a network map that represents direct communication links between respective pairs of cluster nodes of the plurality of cluster nodes and associates a respective minimum transmission hop count for a communication transmitted upstream from a respective network node to the network sink node stored therein.

10. The micro-structure sensor network of claim 9 wherein the respective memory of each cluster node has at least a portion of the network map stored therein.

11. The micro-structure sensor network of claim 8 wherein the respective memory of each cluster node has an initial transmission power level setting for each cluster node within direction communication range of the respective cluster node.

12. The micro-structure sensor network of claim 8 wherein the respective memory of each cluster node has a cluster capabilities data structure that carries information for each sensor node in direct communication with the respective cluster node, wherein the respective information is indicative of the respective at least one characteristic of the respective sensor node and associates the respective at least one characteristic with at least one respective cluster-unique sensor node identifier.

13. A method of establishing a low-power cluster of wireless sensor nodes, comprising:
   wirelessly broadcasting a first registration message from a cluster node to a plurality of unregistered sensor nodes that are in direct communication range with the cluster node;
   initiating a current registration interval of time in response to broadcasting the registration message;
   receiving at the cluster node a number of registration requests prior to an end of the current registration interval;
   determining at the cluster node after the end of the current registration interval whether to wirelessly broadcast a second registration message from the cluster node or whether to register one of the unregistered sensor nodes based at least partially upon the number of received registration requests;
   in response to determining to broadcast the second registration message:
      broadcasting the second registration message from the cluster node to the plurality of unregistered sensor nodes that are in direct communication range with the cluster node; and
      initiating a subsequent registration interval of time in response to broadcasting the registration message;
   and in response to determining to register one of the unregistered sensor nodes:
      associating at the cluster node a respective unregistered sensor node with a dynamically generated cluster unique sensor node identifier in response to the cluster node receiving from the respective sensor node a respective registration request; and registering at the cluster node the previously unregistered respective sensor node having the dynamically generated cluster unique sensor node identifier associated therewith.

14. The method of claim 13 wherein registering at the cluster node the previously unregistered respective sensor node having the dynamically generated cluster-unique sensor node identifier associated therewith includes:

receiving at the cluster node a message having at least one characteristic of the respective unregistered sensor node;

associating at the cluster node the at least one characteristic of the respective unregistered sensor node with the cluster-unique sensor node identifier that is associated with the respective unregistered sensor node; and maintaining at the cluster node a cluster capabilities data structure that carries information for each sensor node in direct communication with the respective cluster node, wherein the respective information is indicative of the respective at least one characteristic of the respective sensor node and associates the respective at least one characteristic with at least one respective cluster-unique sensor node identifier.

15. The method of claim 13, further comprising:

dynamically generating at the cluster node the respective cluster unique sensor node identifier.

16. The method of claim 13 wherein determining at the cluster node whether to wirelessly broadcast a second registration message from the cluster node or whether to register one of the unregistered sensor nodes based at least partially upon the number of received registration requests includes:

determining to register the respective unregistered senor node if the number of received registration requests is one registration request;

determining to broadcast a registration command message carrying a parameter for generating a pseudo random number if the number of received registration requests is greater than one registration request; and determining to broadcast a registration prompt message if the number of received registration requests is zero registration requests.

17. The method of claim 13 wherein determining at the cluster node whether to wirelessly broadcast a second registration message from the cluster node or whether to register one of the unregistered sensor nodes based at least partially upon the number of received registration requests includes:

counting a number of registration prompt messages that are broadcasted after the broadcast of the registration command message;

determining if the number of broadcasted registration prompt messages is equal to or greater than a limit; and only broadcasting a subsequent registration prompt message if the number broadcasted registration prompt messages is less than the limit.

18. The method of claim 13, further comprising:

receiving at the cluster node a second number of registration requests prior to an end of the subsequent registration interval;

determining at the cluster node after the end of the subsequent registration interval whether to wirelessly broadcast a third registration message from the cluster node or whether to register a second one of the unregistered sensor nodes based at least partially upon the second number of received registration requests;

in response to determining to broadcast the third registration message:

broadcasting the third registration message from the cluster node to the plurality of unregistered sensor nodes that are in direct communication range with the cluster node; and initiating another registration interval of time in response to broadcasting the registration message;

and in response to determining to register the second one of the unregistered sensor nodes:

associating at the cluster node a respective second unregistered sensor node with a dynamically generated cluster-unique sensor node identifier in response to the cluster node receiving from the respective second sensor node a respective second registration request; and registering at the cluster node the previously unregistered respective second sensor node having the dynamically generated cluster-unique sensor node identifier associated therewith.

19. A cluster node comprising:

a micro-structure housing;

a wireless communication device carried by the housing;

a processor in communication with the wireless communication device and carried by the micro-structure housing that executes instructions; and a memory in communication with the processor and carried by the micro-structure housing and having instructions stored therein that cause the processor to:

broadcast a first registration message to a plurality of unregistered sensor nodes that are in direct communication range with the cluster node;

initiate a current registration interval of time in response to broadcasting the registration message;

determine after an end of the current registration interval whether to wirelessly broadcast a second registration message from the cluster node or whether to register one of the unregistered sensor nodes based at least partially upon a number of received registration requests;

in response to determining to broadcast the second registration message:

broadcast the second registration message to the plurality of unregistered sensor nodes that are in direct communication range with the cluster node; and initiate a subsequent registration interval of time in response to broadcasting the registration message;

and in response to determining register one of the unregistered sensor nodes:

associate at the cluster node a respective unregistered sensor node with a dynamically generated cluster unique sensor node identifier in response to the cluster node receiving from the respective sensor node a respective registration request; and register the previously unregistered respective sensor node having the dynamically generated cluster unique sensor node identifier associated therewith.

20. The cluster node of claim 19 wherein the instruction that causes the processor to register the previously unregistered respective sensor node having the dynamically generated cluster-unique sensor node identifier associated therewith includes further instructions that cause the processor to:

associate at least one characteristic of the respective unregistered sensor node with the cluster-unique sensor node identifier that is associated with the respective unregistered sensor node; and maintain a cluster capabilities data structure that carries information for each sensor node in direct communication with the respective cluster node, wherein the respective information is indicative of the respective at least one characteristic of the respective sensor node and associates the respective at least one characteristic with at least one respective cluster-unique sensor node identifier.

21. The cluster node of claim 19 wherein the memory stores further instructions that cause the processor to:
dynamically generate the respective cluster unique sensor node identifier.

22. The cluster node of claim 19 wherein the instructions that cause the processor to determine whether to wirelessly broadcast a second registration message from the cluster node or whether to register one of the unregistered sensor nodes based at least partially upon a number of received registration requests includes further instructions that cause the processor to:
determine to register the respective unregistered senor node if the number of received registration requests is one registration request;
determine to broadcast a registration command message carrying a parameter for generating a pseudo random number if the number of received registration requests is greater than one registration request; and
determine to broadcast a registration prompt message carrying if the number of received registration requests is zero registration requests.

23. The method of claim 19 wherein the memory stores further instructions that cause the processor to:
determine after an end of the subsequent registration interval whether to wirelessly broadcast a third registration message from the cluster node or whether to register a second one of the unregistered sensor nodes based at least partially upon a second number of received registration requests;
in response to determining to broadcast the third registration message:
broadcast the third registration message from the cluster node to the plurality of unregistered sensor nodes that are in direct communication range with the cluster node; and
initiate another registration interval of time in response to broadcasting the registration message;
and in response to determining to register the second one of the unregistered sensor nodes:
associate at the cluster node a respective second unregistered sensor node with a dynamically generated cluster-unique sensor node identifier in response to the cluster node receiving from the respective second sensor node a respective second registration request; and
register at the cluster node the previously unregistered respective second sensor node having the dynamically generated cluster-unique sensor node identifier associated therewith.

* * * * *

UNITED STATES PATENT AND TRADEMARK OFFICE
CERTIFICATE OF CORRECTION

| | | |
|---|---|---|
| PATENT NO. | : 7,920,512 B2 | |
| APPLICATION NO. | : 11/848121 | |
| DATED | : April 5, 2011 | |
| INVENTOR(S) | : Paul A. Maltseff et al. | |

It is certified that error appears in the above-identified patent and that said Letters Patent is hereby corrected as shown below:

<u>Column 33, Line 33</u>
"determining to register the respective unregistered senor" should read, --determining to register the respective unregistered sensor--.

Signed and Sealed this
Eighteenth Day of October, 2011

David J. Kappos
*Director of the United States Patent and Trademark Office*